US012047290B2

(12) United States Patent
Keane et al.

(10) Patent No.: US 12,047,290 B2
(45) Date of Patent: Jul. 23, 2024

(54) SELECTIVE HANDLING OF TRAFFIC RECEIVED FROM ON-PREMISES DATA CENTERS

(71) Applicant: Oracle International Corporation, Redwood Shores, CA (US)

(72) Inventors: John Eric Keane, Metuchen, NJ (US); Myron Decker King, Arlington, MA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 17/834,113

(22) Filed: Jun. 7, 2022

(65) Prior Publication Data
US 2023/0031462 A1 Feb. 2, 2023

Related U.S. Application Data

(60) Provisional application No. 63/227,722, filed on Jul. 30, 2021.

(51) Int. Cl.
*H04L 45/74* (2022.01)
*H04L 9/40* (2022.01)
(Continued)

(52) U.S. Cl.
CPC .......... *H04L 45/74* (2013.01); *H04L 12/4633* (2013.01); *H04L 12/4641* (2013.01);
(Continued)

(58) Field of Classification Search
CPC . H04L 45/74; H04L 12/4633; H04L 12/4641; H04L 12/66; H04L 45/42; H04L 45/566; H04L 63/0236; H04L 69/22
(Continued)

(56) References Cited

U.S. PATENT DOCUMENTS 10,503,843 B2 * 12/2019 Keane .................. G06Q 50/08
10,868,760 B2 * 12/2020 Banerjee ............. H04L 61/2521
(Continued)

FOREIGN PATENT DOCUMENTS

CN     107465590 B  * 11/2020  ......... H04L 12/4625
CN     116897527 A  * 10/2023  ......... H04L 61/2503
(Continued)

OTHER PUBLICATIONS

Garden: Generic Addressing and Routing for Data Center Networks Yan Hu; Ming Zhu; Yong Xia; Kai Chen;Yanlin Luo 2012 IEEE Fifth International Conference on Cloud Computing (Year: 2012).*
(Continued)

*Primary Examiner* — Melvin H Pollack
(74) *Attorney, Agent, or Firm* — Kilpatrick Townsend & Stockton LLP

(57) ABSTRACT

A redirector (RD) in a cloud hosted data center receives a packet originating from a source device in an on-premises data center. The packet is directed to a destination IP address associated with a router located in the cloud hosted data center. A destination address field in a header of the packet is set to the destination IP address. The RD determines whether the packet is to be forwarded to the router or to a host machine implementing a service host that implements a tunnel end-point in a VCN. Responsive to determining that the packet is to be forwarded to the host machine: the RD sets the destination address field to an address associated with the service host, and forwards the packet to the host machine. Responsive to determining that the packet is to be forwarded to the router, the RD forwards the packet to the router.

17 Claims, 20 Drawing Sheets

(51) Int. Cl.
*H04L 12/46* (2006.01)
*H04L 12/66* (2006.01)
*H04L 45/00* (2022.01)
*H04L 45/42* (2022.01)
*H04L 69/22* (2022.01)

(52) U.S. Cl.
CPC .............. *H04L 12/66* (2013.01); *H04L 45/42* (2013.01); *H04L 45/566* (2013.01); *H04L 63/0236* (2013.01); *H04L 69/22* (2013.01)

(58) Field of Classification Search
USPC ......................................................... 709/238
See application file for complete search history.

(56) References Cited

U.S. PATENT DOCUMENTS

| | | | | |
|---|---|---|---|---|
| 10,951,522 | B2* | 3/2021 | Merchant | H04L 45/74 |
| 11,095,557 | B2* | 8/2021 | Devireddy | H04L 45/64 |
| 11,095,558 | B2* | 8/2021 | Cheng | H04L 49/70 |
| 11,184,192 | B2* | 11/2021 | Huang | H04L 45/02 |
| 11,233,778 | B2* | 1/2022 | Abraham | H04L 45/745 |
| 11,245,621 | B2* | 2/2022 | Chanda | H04L 45/586 |
| 11,265,285 | B2* | 3/2022 | Tsirkin | H04L 61/103 |
| 11,271,905 | B2* | 3/2022 | Cometto | H04L 61/2514 |
| 11,310,149 | B1* | 4/2022 | Deb | H04L 45/74 |
| 11,336,573 | B2* | 5/2022 | Janakiraman | H04L 61/5007 |
| 11,343,185 | B2* | 5/2022 | Vysotsky | H04L 67/141 |
| 11,394,647 | B1* | 7/2022 | Manoharan | H04L 12/4633 |
| 11,477,270 | B1* | 10/2022 | Manoharan | H04L 45/586 |
| 11,502,994 | B2* | 11/2022 | Vemulpali | H04L 61/103 |
| 11,570,097 | B1* | 1/2023 | Arumugam | H04L 45/04 |
| 11,601,362 | B2* | 3/2023 | Ravinoothala | H04L 45/42 |
| 11,601,365 | B2* | 3/2023 | Qian | H04L 45/586 |
| 11,606,286 | B2* | 3/2023 | Michael | H04L 45/24 |
| 11,627,080 | B2* | 4/2023 | Hira | H04L 45/04 370/392 |
| 11,647,083 | B2* | 5/2023 | Khanal | H04L 67/1027 370/254 |
| 11,652,736 | B2* | 5/2023 | Talur | H04L 12/4641 370/351 |
| 11,824,773 | B2* | 11/2023 | Qian | H04L 45/02 |
| 11,831,551 | B2* | 11/2023 | Zhang | H04L 49/70 |
| 11,902,264 | B2* | 2/2024 | Wang | H04L 63/0272 |
| 2008/0317056 | A1* | 12/2008 | Curtis | H04L 45/12 370/409 |
| 2012/0300631 | A1* | 11/2012 | Zee | H04W 76/15 370/235 |
| 2015/0200847 | A1* | 7/2015 | Gourlay | H04L 41/0895 370/392 |
| 2016/0149774 | A1* | 5/2016 | Chastain | G06F 9/45558 370/241 |
| 2017/0163530 | A1* | 6/2017 | Drake | H04L 45/66 |
| 2017/0214613 | A1* | 7/2017 | Zhang | H04L 45/74 |
| 2019/0342373 | A1* | 11/2019 | Li | H04L 12/66 |
| 2021/0266256 | A1* | 8/2021 | Janakiraman | H04L 43/16 |
| 2021/0392562 | A1* | 12/2021 | Thorat | H04L 45/66 |
| 2022/0052904 | A1* | 2/2022 | Howard | H04L 47/41 |
| 2022/0321604 | A1* | 10/2022 | Majumdar | H04L 63/104 |
| 2022/0360566 | A1* | 11/2022 | Sawant | H04L 63/061 |
| 2022/0385577 | A1* | 12/2022 | Kim | H04L 67/1008 |

FOREIGN PATENT DOCUMENTS

| | | | | |
|---|---|---|---|---|
| WO | WO-2011041159 A1 * | 4/2011 | ............. | H04L 12/28 |
| WO | WO-2020206361 A1 * | 10/2020 | ......... | H04L 41/0853 |

OTHER PUBLICATIONS

Garden: Generic Addressing and Routing for Data Center Networks Yan Hu; Ming Zhu; Yong Xia; Kai Chen;Yanlin Luo 2012 IEEE Fifth International Conference on Cloud Computing (Year: 2012) (Year: 2012).*

* cited by examiner

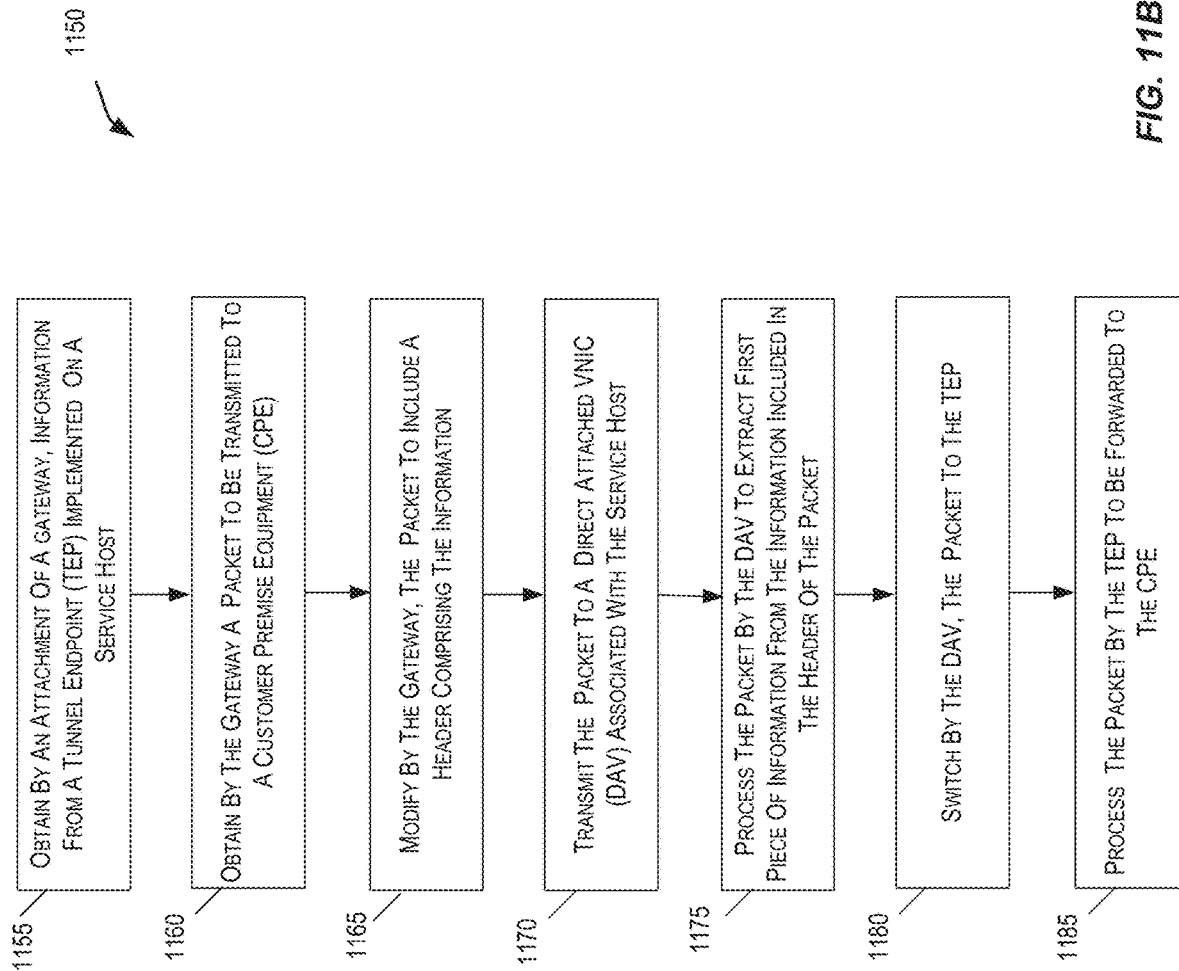

SELECTIVE HANDLING OF TRAFFIC RECEIVED FROM ON-PREMISES DATA CENTERS

CROSS-REFERENCES TO RELATED APPLICATIONS

This application is a non-provisional of and claims the benefit of the filing date of U.S. Provisional Application No. 63/227,722, filed on Jul. 30, 2021, which is incorporated herein by reference in its entirety for all purposes.

FIELD

The present disclosure relates to a framework for handling traffic e.g., customer connections between a customer's on-premises data center and the customer's virtual cloud network.

BACKGROUND

A cloud service provider (CSP) provides a variety of services to users or customers on demand using different systems and infrastructure. CSP provides infrastructure that can be used by customers to build their own networks and deploy customer resources. Most customers generally have resources deployed both in their own "on-premises" data centers or networks and also in customer VCNs deployed in a CSP-provided data center in the cloud. Customers thus want their resources in the on-premises data centers to be able to communicate with resources in their customer VCNs, and vice versa. To facilitate such communications, most CSPs provide services that enable communication channels or connections to be set up where one endpoint of the communication channel or connection is in the customer on-premises data center the other endpoint is in cloud data center.

On the cloud data center side, the connections are facilitated using one or more legacy routers that are programmed to terminate customer connections and forward traffic sent from the customer on-premises data center to the appropriate customer VCN. The use of legacy routers has several limitations. For instance, the legacy routers provide reduced support for the latest networking and/or cryptographic algorithms, which constantly keep evolving. Further, virtual private network support is not a priority for the manufacturers of such legacy routers. Additionally, the legacy routers are expensive to procure and incur scalability issues. Embodiments discussed herein address these and other issues individually as well as collectively.

SUMMARY

The present disclosure relates generally to a framework for handling traffic e.g., customer connections between a customer's on-premises data center and the customer's virtual cloud network. Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the detailed description section, and further description is provided therein.

One embodiment of the present disclosure is directed to a method comprising: receiving, by a redirector (RD) in a cloud hosted data center, a packet originating from a source device in an on-premises data center, the packet being directed to a particular destination IP address associated with a router located in the cloud hosted data center, wherein a destination address field in a header of the packet is set to the particular destination IP address; determining, by the RD, whether the packet is to be forwarded to the router or to a host machine implementing a service host that implements a tunnel end-point (TEP) in a virtual cloud network (VCN); responsive to determining by the RD that the packet is to be forwarded to the host machine: modifying, by the RD, the destination address field to be set to an address associated with the host machine; and causing the packet to be forwarded to the host machine; and responsive to determining by the RD that the packet is to be forwarded to the router, forwarding, by the RD, the packet to the router.

An aspect of the present disclosure provides for a computing device located in a cloud hosted data center, the computing device comprising: a processor; and a memory including instructions that, when executed with the processor, cause the computing device to, at least: receive a packet originating from a source device in an on-premises data center, the packet being directed to a particular destination IP address associated with a router located in the cloud hosted data center, wherein a destination address field in a header of the packet is set to the particular destination IP address; determine whether the packet is to be forwarded to the router or to a host machine implementing a service host that implements a tunnel end-point (TEP) in a virtual cloud network (VCN); responsive to determining that the packet is to be forwarded to the host machine: modify the destination address field to be set to an address associated with the host machine; and cause the packet to be forwarded to the host machine; and responsive to determining that the packet is to be forwarded to the router, forwarding the packet to the router.

Another aspect of the present disclosure provides for a computer readable medium storing specific computer-executable instructions that, when executed by a processor, cause a computer system to at least: receive, by a redirector (RD) in a cloud hosted data center, a packet originating from a source device in an on-premises data center, the packet being directed to a particular destination IP address associated with a router located in the cloud hosted data center, wherein a destination address field in a header of the packet is set to the particular destination IP address; determine, by the RD, whether the packet is to be forwarded to the router or to a host machine implementing a service host that implements a tunnel end-point (TEP) in a virtual cloud network (VCN); responsive to determining by the RD that the packet is to be forwarded to the host machine: modify, by the RD, the destination address field to be set to an address associated with the host machine; and cause the packet to be forwarded to the host machine; and responsive to determining by the RD that the packet is to be forwarded to the router, forward, by the RD, the packet to the router.

The foregoing, together with other features and embodiments will become more apparent upon referring to the following specification, claims, and accompanying drawings.

BRIEF DESCRIPTION OF THE DRAWINGS

Features, embodiments, and advantages of the present disclosure are better understood when the following Detailed Description is read with reference to the accompanying drawings.

FIG. 11B illustrates another simplified flowchart depicting steps performed by a service host in forwarding data packets originating from the customer's VCN and directed to the CPE, according to certain embodiments.

DETAILED DESCRIPTION

Figure 1:
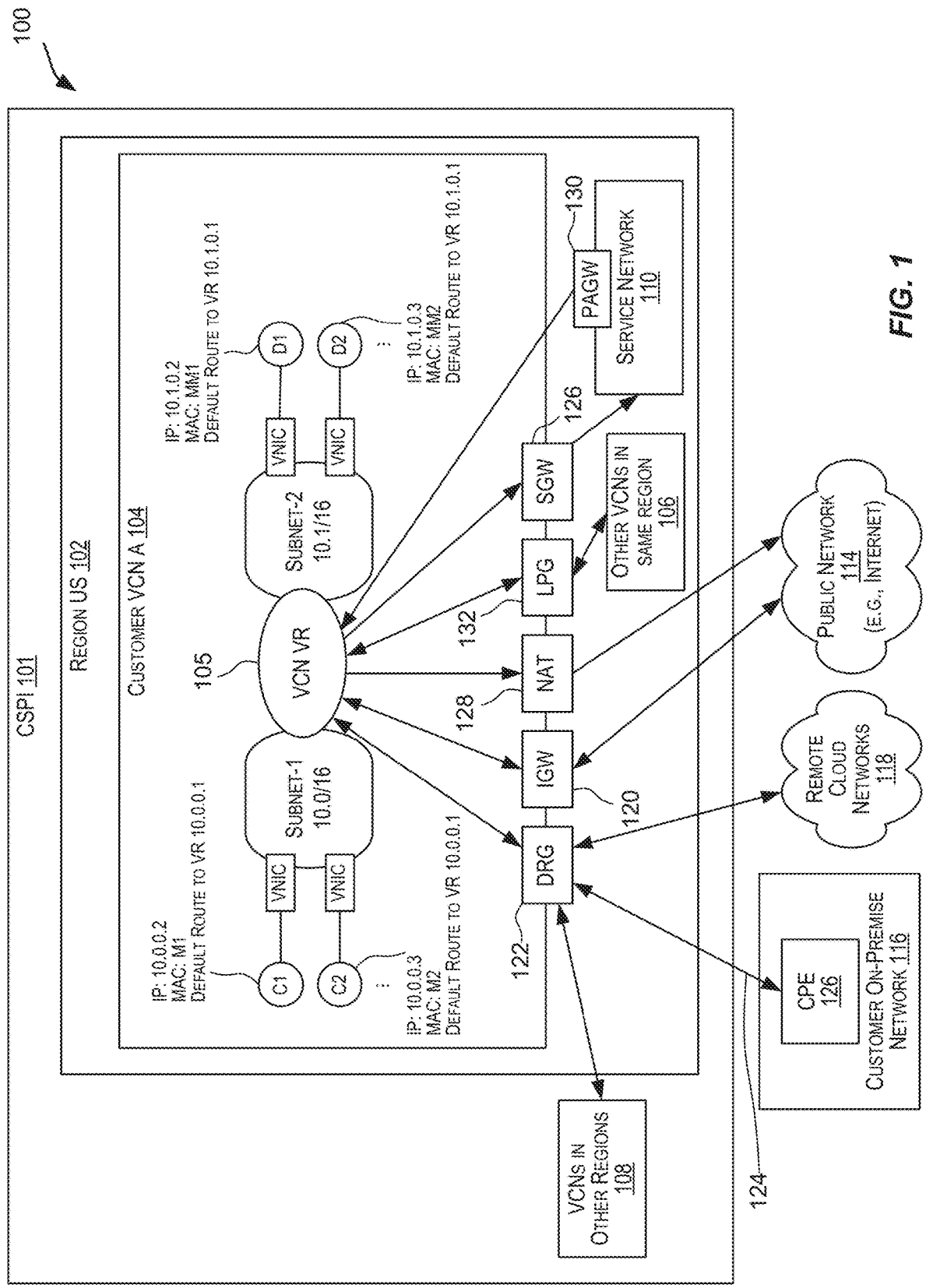
FIG. 1 is a high-level diagram of a distributed environment showing a virtual or overlay cloud network hosted by a cloud service provider infrastructure according to certain embodiments.

In the following description, for the purposes of explanation, specific details are set forth in order to provide a thorough understanding of certain embodiments. However, it will be apparent that various embodiments may be practiced without these specific details. The figures and descriptions are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure describes new and improved techniques for facilitating communications between a customer's on-premises data center and the customer's virtual cloud network (VCN) that is hosted by a data center provided by a cloud service provider (CSP) over connections (e.g., virtual private network (VPN) connections) established between the customer's on-premises data center and the CSP's data center in the cloud. More particularly, a service is provided for facilitating such communications, where the service is implemented in an overlay network built upon physical networking infrastructure provided by the CSP. Novel techniques are also described for selectively and incrementally migrating customers from using legacy architectures to the new enhanced overly network based architecture described herein.

A CSP provides a variety of services to users or customers on demand using different systems and infrastructure (referred to herein as cloud infrastructure). In certain embodiments, a CSP may provide services under an Infrastructure-as-a-Service model, wherein the CSP provides infrastructure that can be used by customers to build their own networks and deploy customer resources. The CSP-provided infrastructure may include interconnected high-performance computer resources including various host machines (also referred to as hosts), memory resources, and network resources that form a physical network, which is referred to as a substrate network or an underlay network. The CSP-provided infrastructure may be spread across one or more data centers that may be geographically spread across one or more regions.

The physical network of the CSP, which includes the various host machines, memory resources, and network resources, provides the underlying basis for creating one or more virtual or overlay networks on top of the physical network. These virtual or overlay networks (also referred to as software-based or software-defined networks) are implemented using software virtualization technologies to create layers of network abstraction that can be run on top of the physical network. Overlay networks can take on many forms. Overlay networks typically use Layer-3 IP addressing with endpoints designated by their virtual IP addresses. This method of overlay networking is often referred to as virtual Layer 3 networking.

When a customer subscribes to or registers for an IaaS service provided by a CSP, a tenancy is created for that customer, where the tenancy is a secure and isolated partition within the CSP's infrastructure where the customer can create, organize, and administer their cloud resources. For example, a customer can use resources provided by the CSP to build one or multiple customizable and private virtual network(s) referred to as virtual cloud networks (VCNs) within the customer's tenancy. One or more customer resources, such as compute instances (e.g., virtual machines, bare metal instances, etc.) can be deployed on these customer VCNs.

Most customers generally have resources deployed both in their own private data centers or networks (referred to as "on-premises" data centers or networks) and also in customer VCNs deployed in a CSP-provided data center in the cloud (referred to as cloud data centers). Customers thus want their resources in the on-premises data centers to be able to communicate with resources in their customer VCNs, and vice versa. To facilitate such communications, most CSPs provide services that enable communication channels or connections to be set up where one endpoint of the communication channel or connection is in customer on-premises data center the other endpoint is in cloud data center. The device or equipment in the customer on-premises data center that forms one end point for the connection is referred to as the customer premise equipment (CPE). The CPE may, for example, be an on-premises router on the on-premises data center. The connection can traverse one or more communication networks, which may include a public network such as the Internet. Various different communication protocols may be used to facilitate communications over these connections such as MPLS circuits, a virtual private network (VPN) (e.g., Internet Protocol Security (IPsec) VPN), and others. For example, a customer can set up a secure IPsec VPN connection between the customer's on-premises data center or network and the cloud data center that hosts the customer VCN.

Using VPN connections as an example, on the cloud data center side, the connections are facilitated using one or more network devices such as routers (referred to herein as legacy routers). The legacy routers terminate the VPN connection on the cloud data center side and route traffic sent from the customer on-premises data center to the appropriate customer VCN. These legacy routers are situated in the physical network of the CSP's infrastructure. In some implementations, the CSP's physical network is segmented into different portions referred to as enclaves. The enclaves include a service enclave, where core infrastructure services e.g., networking, identify and management, load balancing, auditing, etc., are provisioned.

The use of such legacy routers however has several limitations. For example, these legacy routers are manufactured and provided by network device manufacturers that are far removed and do not properly understand the needs of the CSPs thus leading to problems and limitations. These limitations include, for example, a) reduced support for the latest and best cryptographic algorithms which constantly keep evolving, thus forcing customers to compromise their security needs with being restricted to older and not-current protocols, b) VPN support is not a priority for the legacy router manufacturers, c) firmware release cycles for these legacy routers are slow, mainly due to the hardware complexity of the router platform, d) deciphering causes of VPN failures on the legacy routers is slow, thereby delaying problem resolution, e) increased expenses, since legacy routers are very expensive to procure, and f) scalability issues (e.g., legacy routers are purchased in increments requiring purchase orders, etc.). Legacy routers also have high overhead in unused capacity scenarios. Moreover, the deployment of the VPN service in the service enclave presents additional challenges such as-adequate server capacity is typically difficult to obtain, and obtaining server capacity for growth requires long lead times, etc.

As described herein, a new service with a new architecture is provided for facilitating the setup of and communications using connections between a customer's on-premises data center and the customer's VCN hosted by a cloud data center. Since these connections are generally VPN connections, the service is referred to herein as VPN-as-a-Service (VPnaaS). The name of the service is however not intended to limit the scope of the service. The VPNaaS may also facilitate connections between an on-premises data center end-point and a cloud data center endpoint using other protocols other than VPN. Instead of implementing this service in the service enclave (i.e., in the physical networking layer) as done in the past, the service is instead implemented in the overlay network that is built on top of the physical network of the CSP. For example, the service is implemented using a separate VCN (sometimes referred to as the VPNaaS VCN) in its own separate tenancy (sometimes referred to as the VPNaaS tenancy). The VPNaaS VCN is separate and independent from the customer VCNs. Likewise, the VPNaaS tenancy is separate from the various customer tenancies associated with the customer VCNs.

In certain embodiments, VPNaaS is implemented using multiple host machines, with different sets of hosts machines provided for different regions provided by the CSP. For a connection, such as a VPN connection, which is terminated by a CPE in an on-premises on one side, the host machines implementing the VPNaaS are configured to terminate the connections on the cloud data center side. The host machines are also configured to facilitate forwarding or routing of traffic coming from the CPE to the appropriate customer VCNs, and in the reverse direction, to facilitate traffic originating from the customer VCNs to the appropriate connections, such that the traffic is communicated to the appropriate CPEs. Each host machine may support terminal endpoints for multiple connections.

The host machines implementing the VPNaaS are also configured to perform other functions related to communications. For example, if the connection is an Internet Protocol Security Virtual Private Network (IPsec VPN), which uses a secure network protocol suite that authenticates and encrypts the packets of data that are communicated between two endpoints. On the cloud data center side, the hosts implementing the VPNaaS are configured to decrypt the communication upon receiving the communications from the CPE, and are configured to encrypt the communications to be sent to the CPE over the IPsec VPN.

The VPNaaS implementation in the overlay network, as described herein, provides several advantages over the prior legacy router-based implementations. The new architecture eliminates dependence on expensive and proprietary legacy routers. As part of the new architecture, a data plane (DP) of the VPN service is shifted from the service enclave (physical network) to an overlay VCN. This provides several advantages:—it offers high and on-demand scalability because new host machines for implementing the VPNaaS can be provisioned as needed, and each host machine can support multiple connection (or tunnel) endpoints. Since the new architecture is within the control of the CSP, the host machines implementing the service can be easily, and as desired, updated to support a wide range of latest protocols. The new architecture also enables faster problem solving and root cause analysis. Compared to the legacy routers-based implementation, the cost of VPNaaS implementation is significantly lower. The new implementation also provides a higher degree of isolation across customer processes and connections.

In conventional legacy router-based implementations, a customer could send traffic (e.g., packets) from the customer's on-premises location to the customer's VCN hosted in the cloud data center by directing the packets to a public IP address assigned to the legacy router (e.g., a header of the packet contained the legacy router's IP address in the destination address field of the header). A CSP may scale the use of the legacy router by advertising the router's public IP address to multiple customers, who then share the common public IP address assigned to the legacy router to terminate their connections. As a result of the new VPNaaS implementation described herein, these customers will need to be migrated from the legacy router implementation to the new VPNaaS overlay-based implementation, without the customers having to change the public IP address (of the legacy router) to which they sent traffic in the past. In other words, the migration is to be completely transparent to the customers. Novel techniques for enabling this migration as described in this disclosure.

A naïve approach to achieve the above-described migration of connections from the legacy routers to the one or more VPNaaS hosts (also referred to herein as service host) is to simply assign the public IP address of the legacy router to a VPNaaS host. However, such an approach is infeasible. Assigning the public IP address to the VPNaaS host entails shifting connections of all customers that use the public IP address, to the VPNaaS host, simultaneously. Such a single shift, i.e., simultaneous shift of all customers, carries considerable risk. Specifically, any customer connection that fails to work correctly on the new architecture will be rendered unusable unless all customers are moved back to the old legacy router-based data plane, and the process of shifting will have to be repeated. In doing so, a significant amount of customer downtime may be experienced.

To avoid this problem, a mechanism for migrating customers in an incremental and selective manner, i.e., on a connection-by-connection basis, is described herein. It is appreciated that the mechanism of migrating customers achieves the migration of each customer without requiring the customers to reconfigure their end of the VPN connection, i.e., the customers do not have to change the public IP address that they send the traffic to.

Example Architecture of Cloud Infrastructure

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premises servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The virtual or overlay networks can include one or more virtual cloud networks (VCNs). The virtual networks are implemented using software virtualization technologies (e.g., hypervisors, functions performed by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)), Virtual Extensible LAN (VXLAN—IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly available hosted distributed environment. CSPI offers high-performance compute resources and capabilities and storage capacity in a flexible virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by CSPI to build one or multiple customizable and private virtual network(s) referred to as virtual cloud networks (VCNs). A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant. In a multi-tenancy architecture, a software or a hardware component serves multiple customers or tenants. Thus, in a multi-tenancy architecture, CSPI resources are shared between multiple customers or tenants. In a multi-tenancy situation, precautions are taken and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. Customer traffic is encapsulated to facilitate routing in the virtual network.

Accordingly, physical addresses (e.g., physical IP addresses) are associated with components in physical networks and overlay addresses (e.g., overlay IP addresses) are associated with entities in virtual networks. Both the physical IP addresses and overlay IP addresses are types of real IP addresses. These are separate from virtual IP addresses, where a virtual IP address maps to multiple real IP addresses. A virtual IP address provides a 1-to-many mapping between the virtual IP address and multiple real IP addresses.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in an virtual network built on top of the physical network components. In certain embodiments, the CSPI is organized and hosted in realms, regions and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connections to on-premises networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a virtual cloud network (VCN), or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premises networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commercial customers. As another example, a realm may be provided for a specific country for customers within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as virtual cloud networks (VCNs). A customer can set up one or more virtual cloud networks (VCNs) using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with public accessible endpoints ("public endpoints") over a public network such as the Internet, with other instances in the same VCN or other VCNs (e.g., the customer's other VCNs, or VCNs not belonging to the customer), with the customer's on-premises data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN.

Each compute instance is associated with a virtual network interface card (VNIC), that enables the compute instance to participate in a subnet of a VCN. A VNIC is a logical representation of physical Network Interface Card (NIC). In general. a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG. 1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control Plane. The configuration information for a VCN may include, for example, information about: the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control Plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control Plane (CP) and the launching of compute instances is handled by a Compute Control Plane. The Compute Control Plane is responsible for allocating the physical resources for the compute instance and then calls the VCN Control Plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane. Examples of a VCN Control Plane are also depicted in FIGS. 12, 13, 14, and 15 (see references 1216, 1316, 1416, and 1516) and described below.

A customer may create one or more VCNs using resources hosted by CSPI. A compute instance deployed on a customer VCN may communicate with different endpoints. These endpoints can include endpoints that are hosted by CSPI and endpoints outside CSPI.

Various different architectures for implementing cloud-based service using CSPI are depicted in FIGS. 1, 2, 3, 4, 5, 12, 13, 14, and 15 are described below. FIG. 1 is a high level diagram of a distributed environment 100 showing an overlay or customer VCN hosted by CSPI according to certain embodiments. The distributed environment depicted in FIG. 1 includes multiple components in the overlay network. Distributed environment 100 depicted in FIG. 1 is merely an example and is not intended to unduly limit the scope of claimed embodiments. Many variations, alternatives, and modifications are possible. For example, in some implementations, the distributed environment depicted in FIG. 1 may have more or fewer systems or components than those shown in FIG. 1, may combine two or more systems, or may have a different configuration or arrangement of systems.

As shown in the example depicted in FIG. 1, distributed environment 100 comprises CSPI 101 that provides services and resources that customers can subscribe to and use to build their virtual cloud networks (VCNs). In certain embodiments, CSPI 101 offers IaaS services to subscribing customers. The data centers within CSPI 101 may be organized into one or more regions. One example region "Region US" 102 is shown in FIG. 1. A customer has configured a customer VCN 104 for region 102. The customer may deploy various compute instances on VCN 104, where the compute instances may include virtual machines or bare metal instances. Examples of instances include applications, database, load balancers, and the like.

In the embodiment depicted in FIG. 1, customer VCN 104 comprises two subnets, namely, "Subnet-1" and "Subnet-2", each subnet with its own CIDR IP address range. In FIG. 1, the overlay IP address range for Subnet-1 is 10.0/16 and the address range for Subnet-2 is 10.1/16. A VCN Virtual Router 105 represents a logical gateway for the VCN that enables communications between subnets of the VCN 104, and with other endpoints outside the VCN. VCN VR 105 is configured to route traffic between VNICs in VCN 104 and gateways associated with VCN 104. VCN VR 105 provides a port for each subnet of VCN 104. For example, VR 105 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 101. A compute instance participates in a subnet via a VNIC associated with the compute instance. For example, as shown in FIG. 1, a compute instance C1 is part of Subnet-1 via a VNIC associated with the compute instance. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a MAC address. For example, in FIG. 1, compute instance C1 has an overlay IP address of 10.0.0.2 and a MAC address of M1, while compute instance C2 has an private overlay IP address of 10.0.0.3 and a MAC address of M2. Each compute instance in Subnet-1, including compute instances C1 and C2, has a default route to VCN VR 105 using IP address 10.0.0.1, which is the IP address for a port of VCN VR 105 for Subnet-1.

Subnet-2 can have multiple compute instances deployed on it, including virtual machine instances and/or bare metal instances. For example, as shown in FIG. 1, compute instances D1 and D2 are part of Subnet-2 via VNICs associated with the respective compute instances. In the embodiment depicted in FIG. 1, compute instance D1 has an overlay IP address of 10.1.0.2 and a MAC address of MM1, while compute instance D2 has an private overlay IP address of 10.1.0.3 and a MAC address of MM2. Each compute instance in Subnet-2, including compute instances D1 and D2, has a default route to VCN VR 105 using IP address 10.1.0.1, which is the IP address for a port of VCN VR 105 for Subnet-2.

VCN A 104 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 104 can communicate with various different endpoints. These endpoints may include endpoints that are hosted by CSPI 200 and endpoints outside CSPI 200. Endpoints that are hosted by CSPI 101 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region 106 or 110, communications between a compute instance in Subnet-1 and an endpoint in service network 110 in the same region); or an endpoint in a VCN in a different region (e.g., communications between a compute instance in Subnet-1 and an endpoint in a VCN in a different region 108). A compute instance in a subnet hosted by CSPI 101 may also communicate with endpoints that are not hosted by CSPI 101 (i.e., are outside CSPI 101). These outside endpoints include endpoints in the customer's on-premises network 116, endpoints within other remote cloud hosted networks 118, public endpoints 114 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 1 wants to send a packet to compute instance D1 in Subnet-2, the packet is first processed by the VNIC associated with compute instance C1. The VNIC associated with compute instance C1 is configured to route the packet to the VCN VR 105 using default route or port 10.0.0.1 of the VCN VR. VCN VR 105 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 104 to an endpoint that is outside VCN 104, the communication is facilitated by the VNIC associated with the source compute instance, VCN VR 105, and gateways associated with VCN 104. One or more types of gateways may be associated with VCN 104. A gateway is an interface between a VCN and another endpoint, where the another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet) or over private networks. Various communication protocols may be used for these communications.

For example, compute instance C1 may want to communicate with an endpoint outside VCN 104. The packet may be first processed by the VNIC associated with source compute instance C1. The VNIC processing determines that the destination for the packet is outside the Subnet-1 of C1. The VNIC associated with C1 may forward the packet to VCN VR 105 for VCN 104. VCN VR 105 then processes the packet and as part of the processing, based upon the destination for the packet, determines a particular gateway associated with VCN 104 as the next hop for the packet. VCN VR 105 may then forward the packet to the particular identified gateway. For example, if the destination is an endpoint within the customer's on-premises network, then the packet may be forwarded by VCN VR 105 to Dynamic Routing Gateway (DRG) gateway 122 configured for VCN 104. The packet may then be forwarded from the gateway to a next hop to facilitate communication of the packet to it final intended destination.

Various different types of gateways may be configured for a VCN. Examples of gateways that may be configured for a VCN are depicted in FIG. 1 and described below. Examples of gateways associated with a VCN are also depicted in FIGS. 12, 13, 14, and 15 (for example, gateways referenced by reference numbers 1234, 1236, 1238, 1334, 1336, 1338, 1434, 1436, 1438, 1534, 1536, and 1538) and described below. As shown in the embodiment depicted in FIG. 1, a Dynamic Routing Gateway (DRG) 122 may be added to or be associated with customer VCN 104 and provides a path for private network traffic communication between customer VCN 104 and another endpoint, where the another endpoint can be the customer's on-premises network 116, a VCN 108 in a different region of CSPI 101, or other remote cloud networks 118 not hosted by CSPI 101. Customer on-premises network 116 may be a customer network or a customer data center built using the customer's resources. Access to customer on-premises network 116 is generally very restricted. For a customer that has both a customer on-premises network 116 and one or more VCNs 104 deployed or hosted in the cloud by CSPI 101, the customer may want their on-premises network 116 and their cloud-based VCN 104 to be able to communicate with each other. This enables a customer to build an extended hybrid environment encompassing the customer's VCN 104 hosted by CSPI 101 and their on-premises network 116. DRG 122 enables this communication. To enable such communications, a communication channel 124 is set up where one endpoint of the channel is in customer on-premises network 116 and the other endpoint is in CSPI 101 and connected to customer VCN 104. Communication channel 124 can be over public communication networks such as the Internet or private communication networks. Various different communication protocols may be used such as IPsec VPN technology over a public communication network such as the Internet, Oracle's FastConnect technology that uses a private network instead of a public network, and others. The device or equipment in customer on-premises network 116 that forms one end point for communication channel 124 is referred to as the customer premise equipment (CPE), such as CPE 126 depicted in FIG. 1. On the CSPI 101 side, the endpoint may be a host machine executing DRG 122.

In certain embodiments, a Remote Peering Connection (RPC) can be added to a DRG, which allows a customer to peer one VCN with another VCN in a different region. Using such an RPC, customer VCN 104 can use DRG 122 to connect with a VCN 108 in another region. DRG 122 may also be used to communicate with other remote cloud networks 118, not hosted by CSPI 101 such as a Microsoft Azure cloud, Amazon AWS cloud, and others.

As shown in FIG. 1, an Internet Gateway (IGW) 120 may be configured for customer VCN 104 the enables a compute instance on VCN 104 to communicate with public endpoints 114 accessible over a public network such as the Internet. IGW 1120 is a gateway that connects a VCN to a public network such as the Internet. IGW 120 enables a public subnet (where the resources in the public subnet have public overlay IP addresses) within a VCN, such as VCN 104, direct access to public endpoints 112 on a public network 114 such as the Internet. Using IGW 120, connections can be initiated from a subnet within VCN 104 or from the Internet.

A Network Address Translation (NAT) gateway 128 can be configured for customer's VCN 104 and enables cloud resources in the customer's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 104, with private access to public endpoints on the Internet. In NAT gateways, connections can be initiated only from the private subnet to the public Internet and not from the Internet to the private subnet.

In certain embodiments, a Service Gateway (SGW) 126 can be configured for customer VCN 104 and provides a path for private network traffic between VCN 104 and supported services endpoints in a service network 110. In certain embodiments, service network 110 may be provided by the CSP and may provide various services. An example of such a service network is Oracle's Services Network, which provides various services that can be used by customers. For example, a compute instance (e.g., a database system) in a private subnet of customer VCN 104 can back up data to a service endpoint (e.g., Object Storage) without needing public IP addresses or access to the Internet. In certain embodiments, a VCN can have only one SGW, and connections can only be initiated from a subnet within the VCN and not from service network 110. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 126 uses the concept of a service Classless Inter-Domain Routing (CIDR) label, which is a string that represents all the regional public IP address ranges for the service or group of services of interest. The customer uses the service CIDR label when they configure the SGW and related route rules to control traffic to the service. The customer can optionally utilize it when configuring security rules without needing to adjust them if the service's public IP addresses change in the future.

A Local Peering Gateway (LPG) 132 is a gateway that can be added to customer VCN 104 and enables VCN 104 to peer with another VCN in the same region. Peering means that the VCNs communicate using private IP addresses, without the traffic traversing a public network such as the Internet or without routing the traffic through the customer's on-premises network 116. In preferred embodiments, a VCN has a separate LPG for each peering it establishes. Local Peering or VCN Peering is a common practice used to establish network connectivity between different applications or infrastructure management functions.

Service providers, such as providers of services in service network 110, may provide access to services using different access models. According to a public access model, services may be exposed as public endpoints that are publicly accessible by compute instance in a customer VCN via a public network such as the Internet and or may be privately accessible via SGW 126. According to a specific private access model, services are made accessible as private IP endpoints in a private subnet in the customer's VCN. This is referred to as a Private Endpoint (PE) access and enables a service provider to expose their service as an instance in the customer's private network. A Private Endpoint resource represents a service within the customer's VCN. Each PE manifests as a VNIC (referred to as a PE-VNIC, with one or more private IPs) in a subnet chosen by the customer in the customer's VCN. A PE thus provides a way to present a service within a private customer VCN subnet using a VNIC. Since the endpoint is exposed as a VNIC, all the features associates with a VNIC such as routing rules, security lists, etc., are now available for the PE VNIC.

A service provider can register their service to enable access through a PE. The provider can associate policies with the service that restricts the service's visibility to the customer tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the customer VCN can access the service by sending traffic to the private IP address of the PE in the customer VCN. A Private Access Gateway (PAGW) 130 is a gateway resource that can be attached to a service provider VCN (e.g., a VCN in service network 110) that acts as an ingress/egress point for all traffic from/to customer subnet private endpoints. PAGW 130 enables a provider to scale the number of PE connections without utilizing its internal IP address resources. A provider needs only configure one PAGW for any number of services registered in a single VCN. Providers can represent a service as a private endpoint in multiple VCNs of one or more customers. From the customer's perspective, the PE VNIC, which, instead of being attached to a customer's instance, appears attached to the service with which the customer wishes to interact. The traffic destined to the private endpoint is routed via PAGW 130 to the service. These are referred to as customer-to-service private connections (C2S connections).

The PE concept can also be used to extend the private access for the service to customer's on-premises networks and data centers, by allowing the traffic to flow through FastConnect/IPsec links and the private endpoint in the customer VCN. Private access for the service can also be extended to the customer's peered VCNs, by allowing the traffic to flow between LPG 132 and the PE in the customer's VCN.

A customer can control routing in a VCN at the subnet level, so the customer can specify which subnets in the customer's VCN, such as VCN 104, use each gateway. A VCN's route tables are used to decide if traffic is allowed out of a VCN through a particular gateway. For example, in a particular instance, a route table for a public subnet within customer VCN 104 may send non-local traffic through IGW 120. The route table for a private subnet within the same customer VCN 104 may send traffic destined for CSP services through SGW 126. All remaining traffic may be sent via the NAT gateway 128. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked and the response is automatically allowed without an explicit security list rule for the response traffic) or stateless.

Access from a customer VCN (i.e., by a resource or compute instance deployed on VCN 104) can be categorized as public access, private access, or dedicated access. Public access refers to an access model where a public IP address or a NAT is used to access a public endpoint. Private access enables customer workloads in VCN 104 with private IP addresses (e.g., resources in a private subnet) to access services without traversing a public network such as the Internet. In certain embodiments, CSPI 101 enables customer VCN workloads with private IP addresses to access the (public service endpoints of) services using a service gateway. A service gateway thus offers a private access model by establishing a virtual link between the customer's VCN and the service's public endpoint residing outside the customer's private network.

Additionally, CSPI may offer dedicated public access using technologies such as FastConnect public peering where customer on-premises instances can access one or more services in a customer VCN using a FastConnect connection and without traversing a public network such as the Internet. CSPI also may also offer dedicated private access using FastConnect private peering where customer on-premises instances with private IP addresses can access the customer's VCN workloads using a FastConnect connection. FastConnect is a network connectivity alternative to using the public Internet to connect a customer's on-premises network to CSPI and its services. FastConnect provides an easy, elastic, and economical way to create a dedicated and private connection with higher bandwidth options and a more reliable and consistent networking experience when compared to Internet-based connections.

Figure 2:
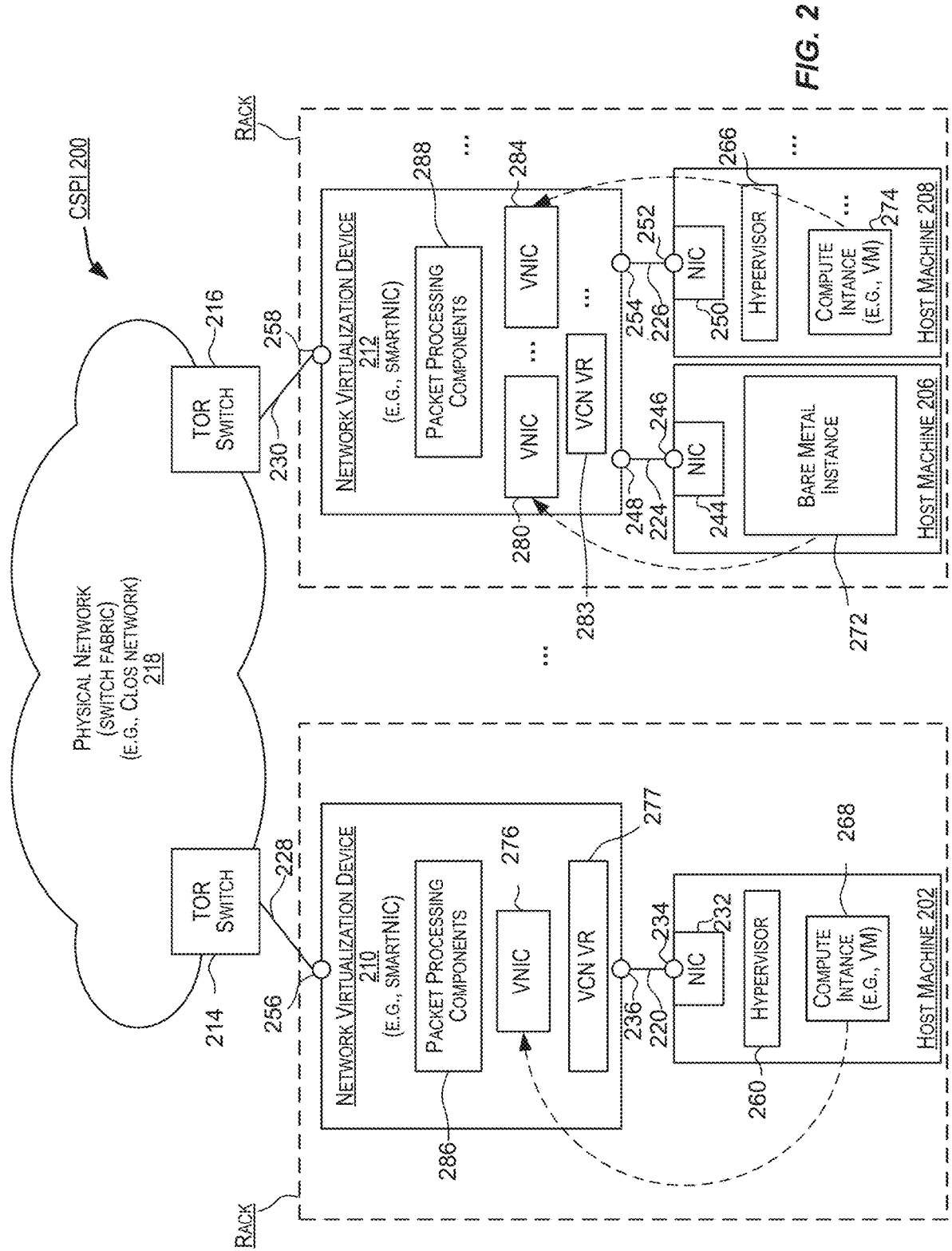
FIG. 2 depicts a simplified architectural diagram of the physical components in the physical network within CSPI according to certain embodiments.

FIG. 1 and the accompanying description above describes various virtualized components in an example virtual network. As described above, the virtual network is built on the underlying physical or substrate network. FIG. 2 depicts a simplified architectural diagram of the physical components in the physical network within CSPI 200 that provide the underlay for the virtual network according to certain embodiments. As shown, CSPI 200 provides a distributed environment comprising components and resources (e.g., compute, memory, and networking resources) provided by a cloud service provider (CSP). These components and resources are used to provide cloud services (e.g., IaaS services) to subscribing customers, i.e., customers that have subscribed to one or more services provided by the CSP. Based upon the services subscribed to by a customer, a subset of resources (e.g., compute, memory, and networking resources) of CSPI 200 are provisioned for the customer. Customers can then build their own cloud-based (i.e., CSPI-hosted) customizable and private virtual networks using physical compute, memory, and networking resources provided by CSPI 200. As previously indicated, these customer networks are referred to as virtual cloud networks (VCNs). A customer can deploy one or more customer resources, such as compute instances, on these customer VCNs. Compute instances can be in the form of virtual machines, bare metal instances, and the like. CSPI 200 provides infrastructure and a set of complementary cloud services that enable customers to build and run a wide range of applications and services in a highly available hosted environment.

In the example embodiment depicted in FIG. 2, the physical components of CSPI 200 include one or more physical host machines or physical servers (e.g., 202, 206, 208), network virtualization devices (NVDs) (e.g., 210, 212), top-of-rack (TOR) switches (e.g., 214, 216), and a physical network (e.g., 218), and switches in physical network 218. The physical host machines or servers may host and execute various compute instances that participate in one or more subnets of a VCN. The compute instances may include virtual machine instances, and bare metal instances. For example, the various compute instances depicted in FIG. 1 may be hosted by the physical host machines depicted in FIG. 2. The virtual machine compute instances in a VCN may be executed by one host machine or by multiple different host machines. The physical host machines may also host virtual host machines, container-based hosts or functions, and the like. The VNICs and VCN VR depicted in FIG. 1 may be executed by the NVDs depicted in FIG. 2. The gateways depicted in FIG. 1 may be executed by the host machines and/or by the NVDs depicted in FIG. 2.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 2, host machines 202 and 208 execute hypervisors 260 and 266, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 2, hypervisor 260 may sit on top of the OS of host machine 202 and enables the computing resources (e.g., processing, memory, and networking resources) of host machine 202 to be shared between compute instances (e.g., virtual machines) executed by host machine 202. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 2 may have the same or different types of hypervisors.

A compute instance can be a virtual machine instance or a bare metal instance. In FIG. 2, compute instances 268 on host machine 202 and 274 on host machine 208 are examples of virtual machine instances. Host machine 206 is an example of a bare metal instance that is provided to a customer.

In certain instances, an entire host machine may be provisioned to a single customer, and all of the one or more compute instances (either virtual machines or bare metal instance) hosted by that host machine belong to that same customer. In other instances, a host machine may be shared between multiple customers (i.e., multiple tenants). In such a multi-tenancy scenario, a host machine may host virtual machine compute instances belonging to different customers. These compute instances may be members of different VCNs of different customers. In certain embodiments, a bare metal compute instance is hosted by a bare metal server without a hypervisor. When a bare metal compute instance is provisioned, a single customer or tenant maintains control of the physical CPU, memory, and network interfaces of the host machine hosting the bare metal instance and the host machine is not shared with other customers or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 2, host machine 202 executes a virtual machine compute instance 268 that is associated with VNIC 276, and VNIC 276 is executed by NVD 210 connected to host machine 202. As another example, bare metal instance 272 hosted by host machine 206 is associated with VNIC 280 that is executed by NVD 212 connected to host machine 206. As yet another example, VNIC 284 is associated with compute instance 274 executed by host machine 208, and VNIC 284 is executed by NVD 212 connected to host machine 208.

For compute instances hosted by a host machine, an NVD connected to that host machine also executes VCN VRs corresponding to VCNs of which the compute instances are members. For example, in the embodiment depicted in FIG. 2, NVD 210 executes VCN VR 277 corresponding to the VCN of which compute instance 268 is a member. NVD 212 may also execute one or more VCN VRs 283 corresponding to VCNs corresponding to the compute instances hosted by host machines 206 and 208.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 2, host machine 202 is connected to NVD 210 using link 220 that extends between a port 234 provided by a NIC 232 of host machine 202 and between a port 236 of NVD 210. Host machine 206 is connected to NVD 212 using link 224 that extends between a port 246 provided by a NIC 244 of host machine 206 and between a port 248 of NVD 212. Host machine 208 is connected to NVD 212 using link 226 that extends between a port 252 provided by a NIC 250 of host machine 208 and between a port 254 of NVD 212.

The NVDs are in turn connected via communication links to top-of-the-rack (TOR) switches, which are connected to physical network 218 (also referred to as the switch fabric).

In certain embodiments, the links between a host machine and an NVD, and between an NVD and a TOR switch are Ethernet links. For example, in FIG. 2, NVDs 210 and 212 are connected to TOR switches 214 and 216, respectively, using links 228 and 230. In certain embodiments, the links 220, 224, 226, 228, and 230 are Ethernet links. The collection of host machines and NVDs that are connected to a TOR is sometimes referred to as a rack.

Figure 5:
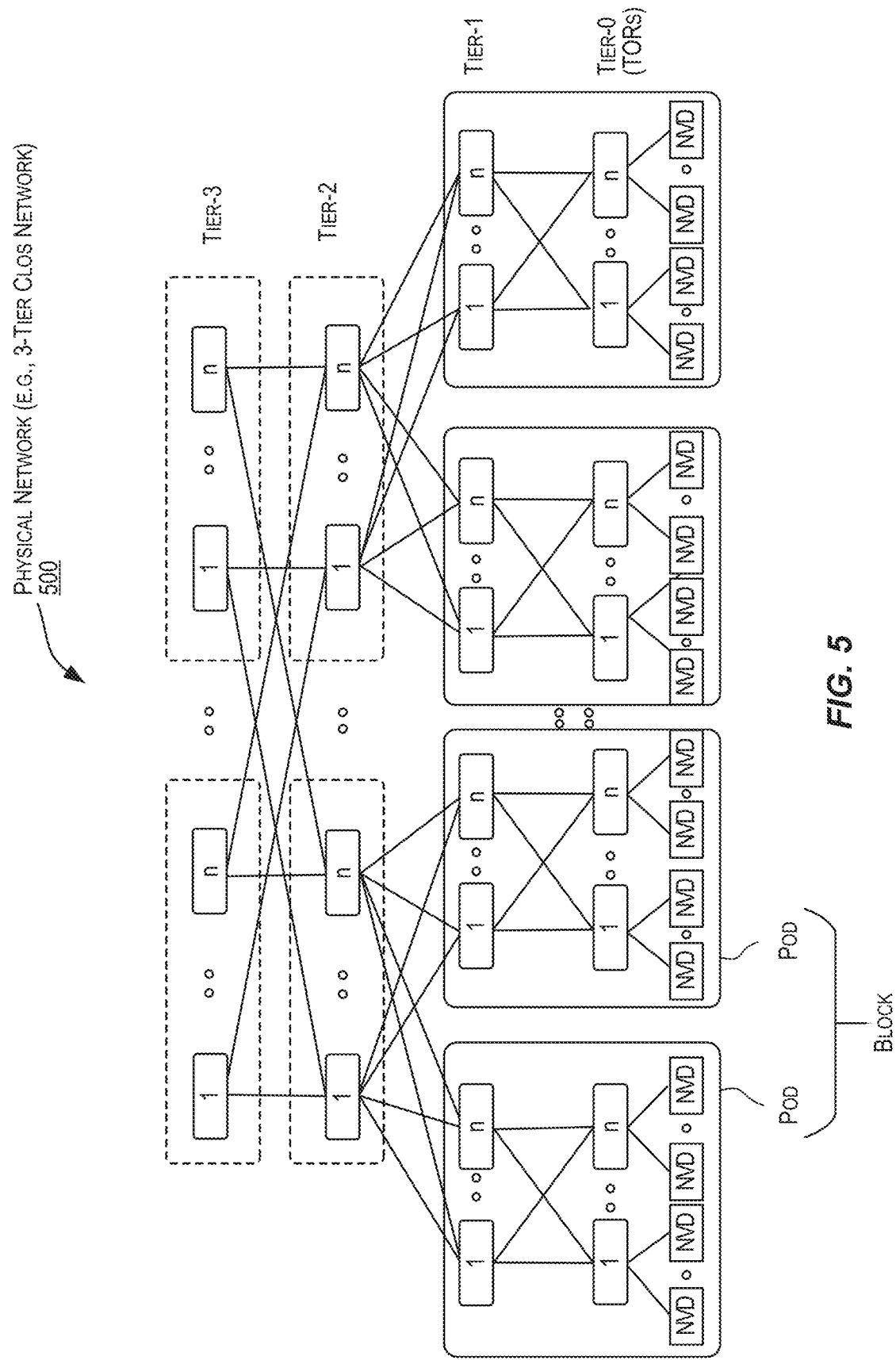
FIG. 5 depicts a simplified block diagram of a physical network provided by a CSPI according to certain embodiments.

Physical network 218 provides a communication fabric that enables TOR switches to communicate with each other. Physical network 218 can be a multi-tiered network. In certain implementations, physical network 218 is a multi-tiered Clos network of switches, with TOR switches 214 and 216 representing the leaf level nodes of the multi-tiered and multi-node physical switching network 218. Different Clos network configurations are possible including but not limited to a 2-tier network, a 3-tier network, a 4-tier network, a 5-tier network, and in general a "n"-tiered network. An example of a Clos network is depicted in FIG. 5 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 2, host machine 202 is connected to NVD 210 via NIC 232 of host machine 202. In a many-to-one configuration, multiple host machines are connected to one NVD. For example, in FIG. 2, host machines 206 and 208 are connected to the same NVD 212 via NICs 244 and 250, respectively.

Figure 3:
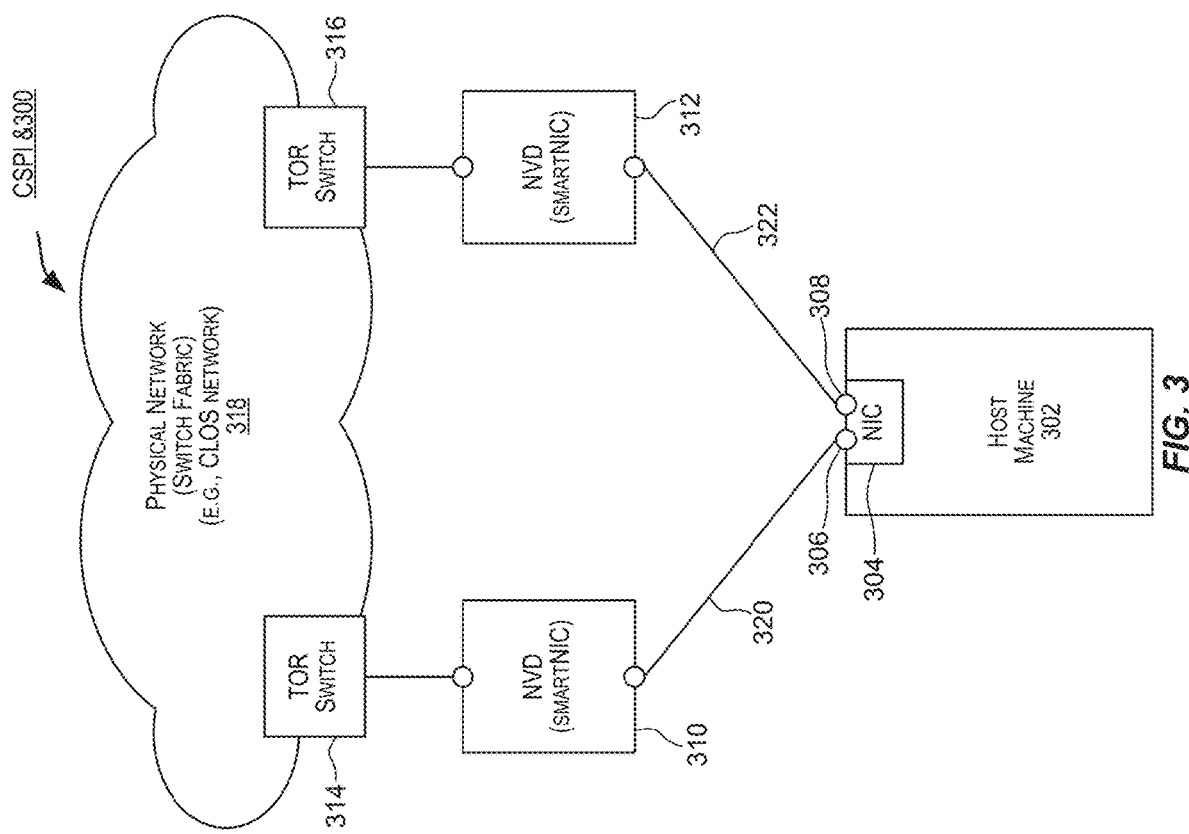
FIG. 3 shows an example arrangement within CSPI where a host machine is connected to multiple network virtualization devices (NVDs) according to certain embodiments.

In a one-to-many configuration, one host machine is connected to multiple NVDs. FIG. 3 shows an example within CSPI 300 where a host machine is connected to multiple NVDs. As shown in FIG. 3, host machine 302 comprises a network interface card (NIC) 304 that includes multiple ports 306 and 308. Host machine 300 is connected to a first NVD 310 via port 306 and link 320, and connected to a second NVD 312 via port 308 and link 322. Ports 306 and 308 may be Ethernet ports and the links 320 and 322 between host machine 302 and NVDs 310 and 312 may be Ethernet links. NVD 310 is in turn connected to a first TOR switch 314 and NVD 312 is connected to a second TOR switch 316. The links between NVDs 310 and 312, and TOR switches 314 and 316 may be Ethernet links. TOR switches 314 and 316 represent the Tier-0 switching devices in multi-tiered physical network 318.

The arrangement depicted in FIG. 3 provides two separate physical network paths to and from physical switch network 318 to host machine 302: a first path traversing TOR switch 314 to NVD 310 to host machine 302, and a second path traversing TOR switch 316 to NVD 312 to host machine 302. The separate paths provide for enhanced availability (referred to as high availability) of host machine 302. If there are problems in one of the paths (e.g., a link in one of the paths goes down) or devices (e.g., a particular NVD is not functioning), then the other path may be used for communications to/from host machine 302.

In the configuration depicted in FIG. 3, the host machine is connected to two different NVDs using two different ports provided by a NIC of the host machine. In other embodiments, a host machine may include multiple NICs that enable connectivity of the host machine to multiple NVDs.

Referring back to FIG. 2, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent MC with an embedded processor onboard. A smartNIC is a separate device from the NICs on the host machines. In FIG. 2, the NVDs 210 and 212 may be implemented as smartNICs that are connected to host machines 202, and host machines 206 and 208, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 200. For example, an NVD may be embodied in a host machine where the functions performed by an NVD are performed by the host machine. As another example, an NVD may be part of a TOR switch or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM) instances, are offered to customers, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 2, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 2 include port 236 on NVD 210, and ports 248 and 254 on NVD 212. A network-facing port of an NVD is a port that is used to connect the NVD to a TOR switch. Examples of network-facing ports in FIG. 2 include port 256 on NVD 210, and port 258 on NVD 212. As shown in FIG. 2, NVD 210 is connected to TOR switch 214 using link 228 that extends from port 256 of NVD 210 to the TOR switch 214. Likewise, NVD 212 is connected to TOR switch 216 using link 230 that extends from port 258 of NVD 212 to the TOR switch 216.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two end-points (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with cis in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. Examples of a VCN Control Plane are also depicted in FIGS. 12, 13, 14, and 15 (see references 1216, 1316, 1416, and 1516) and described below. Examples of a VCN Data Plane are depicted in FIGS. 12, 13, 14, and 15 (see references 1218, 1318, 1418, and 1518) and described below. The control plane functions include functions used for configuring a network (e.g., setting up routes and route tables, configuring VNICs, etc.) that controls how data is to be forwarded. In certain embodiments, a VCN Control Plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the customer's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 2, NVD 210 executes the functionality for VNIC 276 that is associated with compute instance 268 hosted by host machine 202 connected to NVD 210. As another example, NVD 212 executes VNIC 280 that is associated with bare metal compute instance 272 hosted by host machine 206, and executes VNIC 284 that is associated with compute instance 274 hosted by host machine 208. A host machine may host compute instances belonging to different VCNs, which belong to different customers, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 2, NVD 210 executes VCN VR 277 corresponding to the VCN to which compute instance 268 belongs. NVD 212 executes one or more VCN VRs 283 corresponding to one or more VCNs to which compute instances hosted by host machines 206 and 208 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 2. For example, NVD 210 comprises packet processing components 286 and NVD 212 comprises packet processing components 288. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 1 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 1 may be executed or hosted by one or more of the physical components depicted in FIG. 2. For example, the compute instances in a VCN may be executed or hosted by one or more host machines depicted in FIG. 2. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a customer VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination end point of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the customer's on-premises network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 2, a packet originating from compute instance 268 may be communicated from host machine 202 to NVD 210 over link 220 (using NIC 232). On NVD 210, VNIC 276 is invoked since it is the VNIC associated with source compute instance 268. VNIC 276 is configured to examine the encapsulated information in the packet, and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 200 and endpoints outside CSPI 200. Endpoints hosted by CSPI 200 may include instances in the same VCN or other VCNs, which may be the customer's VCNs, or VCNs not belonging to the customer.

Communications between endpoints hosted by CSPI 200 may be performed over physical network 218. A compute instance may also communicate with endpoints that are not hosted by CSPI 200, or are outside CSPI 200. Examples of these endpoints include endpoints within a customer's on-premises network or data center, or public endpoints accessible over a public network such as the Internet. Communications with endpoints outside CSPI 200 may be performed over public networks (e.g., the Internet) (not shown in FIG. 2) or private networks (not shown in FIG. 2) using various communication protocols.

The architecture of CSPI 200 depicted in FIG. 2 is merely an example and is not intended to be limiting. Variations, alternatives, and modifications are possible in alternative embodiments. For example, in some implementations, CSPI 200 may have more or fewer systems or components than those shown in FIG. 2, may combine two or more systems, or may have a different configuration or arrangement of systems. The systems, subsystems, and other components depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 4:
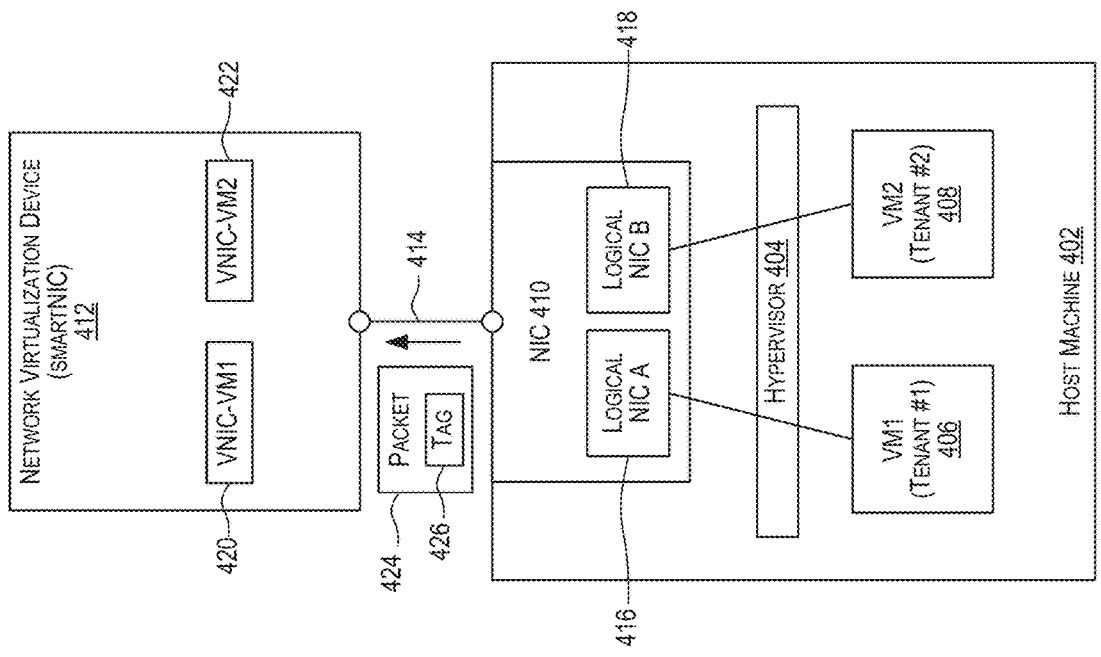
FIG. 4 depicts connectivity between a host machine and an NVD for providing I/O virtualization for supporting multitenancy according to certain embodiments.

FIG. 4 depicts connectivity between a host machine and an NVD for providing I/O virtualization for supporting multitenancy according to certain embodiments. As depicted in FIG. 4, host machine 402 executes a hypervisor 404 that provides a virtualized environment. Host machine 402 executes two virtual machine instances, VM1 406 belonging to customer/tenant #1 and VM2 408 belonging to customer/tenant #2. Host machine 402 comprises a physical NIC 410 that is connected to an NVD 412 via link 414. Each of the compute instances is attached to a VNIC that is executed by NVD 412. In the embodiment in FIG. 4, VM1 406 is attached to VNIC-VM1 420 and VM2 408 is attached to VNIC-VM2 422.

As shown in FIG. 4, NIC 410 comprises two logical NICs, logical NIC A 416 and logical NIC B 418. Each virtual machine is attached to and configured to work with its own logical NIC. For example, VM1 406 is attached to logical NIC A 416 and VM2 408 is attached to logical NIC B 418. Even though host machine 402 comprises only one physical NIC 410 that is shared by the multiple tenants, due to the logical NICs, each tenant's virtual machine believes they have their own host machine and NIC.

In certain embodiments, each logical NIC is assigned its own VLAN ID. Thus, a specific VLAN ID is assigned to logical NIC A 416 for Tenant #1 and a separate VLAN ID is assigned to logical NIC B 418 for Tenant #2. When a packet is communicated from VM1 406, a tag assigned to Tenant #1 is attached to the packet by the hypervisor and the packet is then communicated from host machine 402 to NVD 412 over link 414. In a similar manner, when a packet is communicated from VM2 408, a tag assigned to Tenant #2 is attached to the packet by the hypervisor and the packet is then communicated from host machine 402 to NVD 412 over link 414. Accordingly, a packet 424 communicated from host machine 402 to NVD 412 has an associated tag 426 that identifies a specific tenant and associated VM. On the NVD, for a packet 424 received from host machine 402, the tag 426 associated with the packet is used to determine whether the packet is to be processed by VNIC-VM1 420 or by VNIC-VM2 422. The packet is then processed by the corresponding VNIC. The configuration depicted in FIG. 4 enables each tenant's compute instance to believe that they own their own host machine and NIC. The setup depicted in FIG. 4 provides for I/O virtualization for supporting multi-tenancy.

FIG. 5 depicts a simplified block diagram of a physical network 500 according to certain embodiments. The embodiment depicted in FIG. 5 is structured as a Clos network. A Clos network is a particular type of network topology designed to provide connection redundancy while maintaining high bisection bandwidth and maximum resource utilization. A Clos network is a type of non-blocking, multistage or multi-tiered switching network, where the number of stages or tiers can be two, three, four, five, etc. The embodiment depicted in FIG. 5 is a 3-tiered network comprising tiers 1, 2, and 3. The TOR switches 504 represent Tier-0 switches in the Clos network. One or more NVDs are connected to the TOR switches. Tier-0 switches are also referred to as edge devices of the physical network. The Tier-0 switches are connected to Tier-1 switches, which are also referred to as leaf switches. In the embodiment depicted in FIG. 5, a set of "n" Tier-0 TOR switches are connected to a set of "n" Tier-1 switches and together form a pod. Each Tier-0 switch in a pod is interconnected to all the Tier-1 switches in the pod, but there is no connectivity of switches between pods. In certain implementations, two pods are referred to as a block. Each block is served by or connected to a set of "n" Tier-2 switches (sometimes referred to as spine switches). There can be several blocks in the physical network topology. The Tier-2 switches are in turn connected to "n" Tier-3 switches (sometimes referred to as super-spine switches). Communication of packets over physical network 500 is typically performed using one or more Layer-3 communication protocols. Typically, all the layers of the physical network, except for the TORs layer are n-ways redundant thus allowing for high availability. Policies may be specified for pods and blocks to control the visibility of switches to each other in the physical network so as to enable scaling of the physical network.

A feature of a Clos network is that the maximum hop count to reach from one Tier-0 switch to another Tier-0 switch (or from an NVD connected to a Tier-0-switch to another NVD connected to a Tier-0 switch) is fixed. For example, in a 3-Tiered Clos network at most seven hops are needed for a packet to reach from one NVD to another NVD, where the source and target NVDs are connected to the leaf tier of the Clos network. Likewise, in a 4-tiered Clos network, at most nine hops are needed for a packet to reach from one NVD to another NVD, where the source and target NVDs are connected to the leaf tier of the Clos network. Thus, a Clos network architecture maintains consistent latency throughout the network, which is important for communication within and between data centers. A Clos topology scales horizontally and is cost effective. The bandwidth/throughput capacity of the network can be easily increased by adding more switches at the various tiers (e.g., more leaf and spine switches) and by increasing the number of links between the switches at adjacent tiers.

In certain embodiments, each resource within CSPI is assigned a unique identifier called a Cloud Identifier (CID). This identifier is included as part of the resource's information and can be used to manage the resource, for example, via a Console or through APIs. An example syntax for a CID is:

ocid1.<RESOURCE TYPE>.<REALM>.[REGION] [.FUTURE USE].<UNIQUE ID> where,
ocid1: The literal string indicating the version of the CID;
resource type: The type of resource (for example, instance, volume, VCN, subnet, user, group, and so on);
realm: The realm the resource is in. Example values are "c1" for the commercial realm, "c2" for the Government Cloud realm, or "c3" for the Federal Government Cloud realm, etc. Each realm may have its own domain name;
region: The region the resource is in. If the region is not applicable to the resource, this part might be blank;
future use: Reserved for future use.
unique ID: The unique portion of the ID. The format may vary depending on the type of resource or service.

Figure 6A:
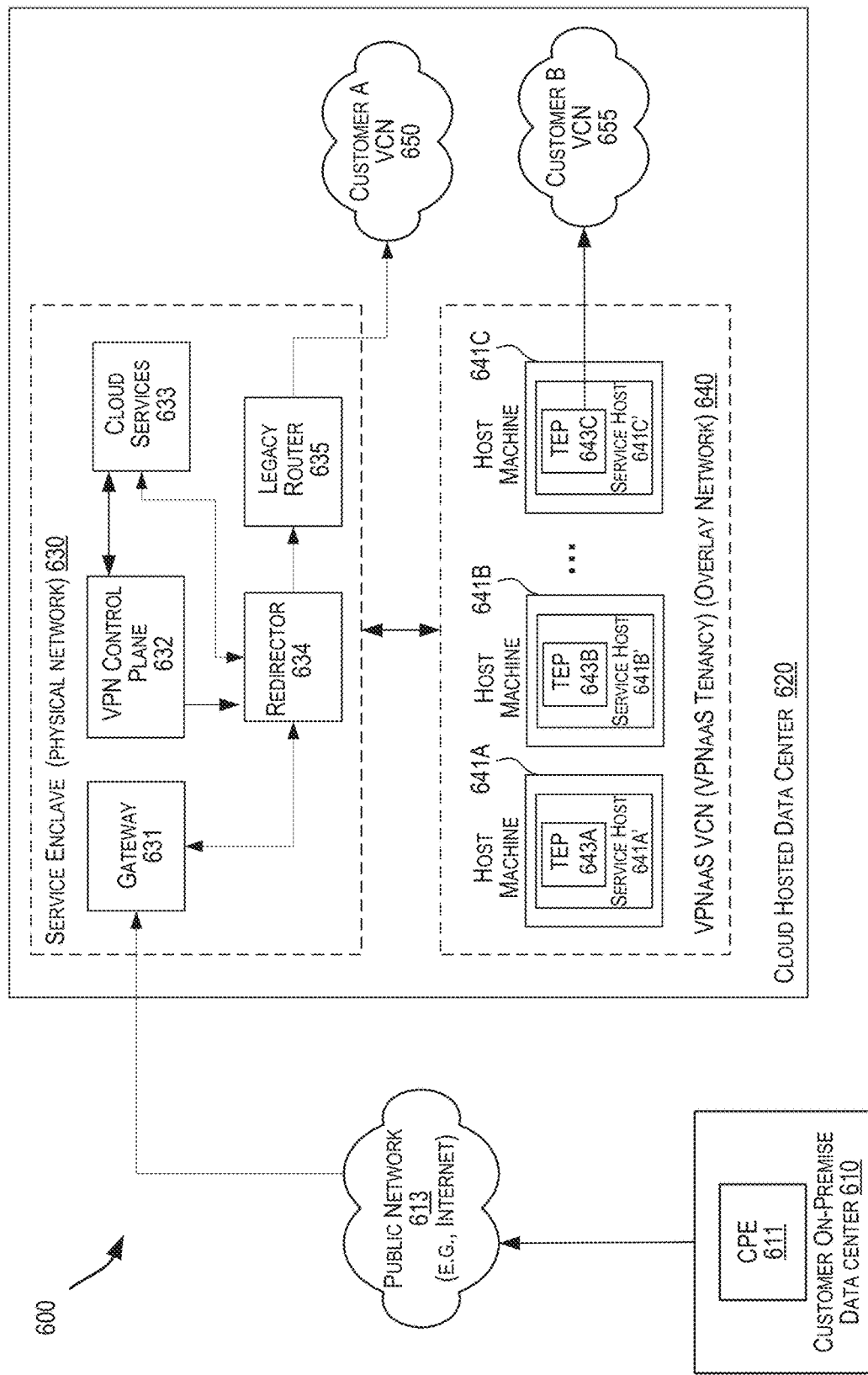
FIG. 6A depicts an exemplary architecture of a Virtual Private Network-as-a-Service (VPNaaS), according to certain embodiments.

FIG. 6A depicts an exemplary architecture 600 of a Virtual Private Network-as-a-Service (VPNaaS), according to certain embodiments. As shown in FIG. 6A, a customer's on-premises data center 610 is communicatively coupled to a cloud hosted data center 620 via a public network 613 e.g., Internet. VPNaaS facilitates the setup of customer connections (e.g. VPN connections) between the customer's on-premises data center 610 and the cloud hosted data center 620. Specifically, one endpoint of the communication channel or connection is in a customer premise equipment (CPE) 611 included in the customer on-premises data center 610, and the other endpoint is in the cloud hosted data center 620.

The cloud hosted data center 620 includes a service enclave 630 and a VPNaaS VCN (referred to as the VPNaaS tenancy or an overlay network) 640. The service enclave (i.e., physical network) 630 hosts a gateway 631, a VPN control plane 632, cloud services 633, a redirector 634, and a legacy router 635. The VPNaaS tenancy 640 includes a plurality of host machines e.g., host machines 641A, 641B, and 641C. Each host machine implements a service host (also referred to herein as VPNaaS host) that implements one or more tunnel end-points (TEPs). For example, the host machine 641A implements a service host 641A' that implements a TEP 643A. According to some embodiments, a service host is defined as a general-purpose compute instance e.g., a virtual machine (VM) or a bare metal instance that is executed in the overlay network. Further, the TEP implemented by the service host e.g., TEP 643A implemented by the service host 641A' corresponds to a container that is executed on the service host and programmed to terminate a connection.

Typically, a customer's connection may be terminated in a router hosted in the service enclave 630, e.g., the legacy router 635. However, as stated previously, the use of legacy routers in terminating connections (e.g. VPN connections) incurs several limitations. In what follows, the VPNaaS implementation is described that migrates the customer's connections from the legacy router 635 to the VPNaaS enclave 640. Specifically, a connection is migrated from the legacy router 635 to the service host (implemented on host machines) and is terminated on a TEP implemented by the service host.

By some embodiments, the cloud services 633 included in the service enclave 630 corresponds to a pool of services such as workflow as a service (WFaaS), Kiev database as a service (KaaS), virtual cloud network (VCN), Kubernetes engine (KE), streaming service (SS), identity and access management (IAM) services, and a registry offered by the cloud service provider. The VPN control plane 632 includes a VPN application interface (i.e., a VPN API), a fleet of VPN workers, and a service host controller. The VPN API is a control interface to the VPNaaS platform. It is responsible for managing VPN connection definition objects in the KaaS database and for creating work requests for the initiation and termination of VPN connections.

The fleet of VPN workers included in the VPN control plane 632 correspond to workflow agents that are implemented to service the various work requests initiated through the VPN API. For instance, the fleet of VPN workers includes an allocator workflow that allocates a new VPN connection on a pair of tunnel end-points and generates the initial configuration information for those endpoints. The fleet of VPN workers also includes a de-allocator workflow that is programmed to delete VPN tunnel endpoints, and remove the corresponding configuration information from the service host controller included in the VPN control plane 632. By one embodiment, the service host controller provides configuration information to the VPNaaS hosts i.e., service hosts that are implemented on host machines and deployed in the VPNaaS tenancy 640. Configuration information may be updated by workflows by the fleet of VPN workers in response to VPN API requests. The service host controller may further presents an application interface (e.g., a REST API) to the VPNaaS hosts that allows the host machine to query for the availability of an updated configuration, and to download the updated configuration.

The gateway 631 included in the service enclave 630 corresponds to an edge router (e.g., an Internet routing gateway) that forms an entry point for connections (e.g., VPN connections) originating from different CPEs (e.g., CPE 611), and entering the service enclave 630. By one embodiment, the legacy router 635 utilizes protocols such as border gateway protocol (BGP) to advertise route information (associated with a destination IP address of the router) to the gateway 631. VPNaaS includes the redirector 634 located in the service enclave 630, which intercepts such advertised route information (by the legacy router 635) and re-advertises, to the gateway 631, the routes (intended for the destination IP address of the router) as preferential routes. In this manner, the gateway forwards packets (e.g., data packets) belonging to a connection to the redirector 634.

By some embodiments, the gateway 631 receives packets from a source device e.g., CPE 611, in the on-premises data center 610. The gateway 631 forwards the packets to the redirector 634. Upon receiving a packet, the redirector 634 determines whether the packet is to be forwarded to the legacy router 635 or to a host machine i.e., to a service host implementing a TEP in the VPNaaS tenancy 640. If the redirector 634 determines that the packet is to be forwarded to a service host in the VPNaaS tenancy 640, then the redirector modifies a destination address field in a header of the packet to reflect an address associated with host machine e.g., the IP address of the service host. In other words, the redirector 634 updates the header of the packet that originally includes the destination IP address of the legacy router 635 included in the destination address field to be set to the address associated with the host machine. Thereafter, the redirector 634 forwards the packet to the service host. In contrast, if the redirector 634 determines that the packet is to be forwarded to the legacy router 635, the redirector simply forwards the packet to the legacy router 635 without any updates to the header of the packet.

The mechanism utilized by the redirector 634 in determining whether the packet is to be sent to the legacy router 635 or to the service host in the VPNaaS tenancy 640 is based on conditions associated with a connection (e.g., VPN connection) that includes the packet. Details pertaining to the mechanism utilized by the redirector 634 is described next with reference to FIG. 7. Thus, as shown in FIG. 6A, for data packet(s) sent by the redirector 634 to the legacy router 635 i.e., for connections not migrated to the VPNaaS tenancy 640, the legacy router 635 forwards the packet(s) belonging to the connection to a customer's VCN e.g., customer A VCN 650 that is a final destination of the data packet. In contrast, for data packet(s) sent by the redirector 634 to a host machine (e.g., host machine 641C) i.e., for connections that are migrated to the VPNaaS tenancy 640, the TEP 643C implemented by the service host 641C' of the host machine 641C, forwards the respective packet(s) belonging to the connection to the customer VCN, e.g., customer B VCN 655.

Figure 6B:
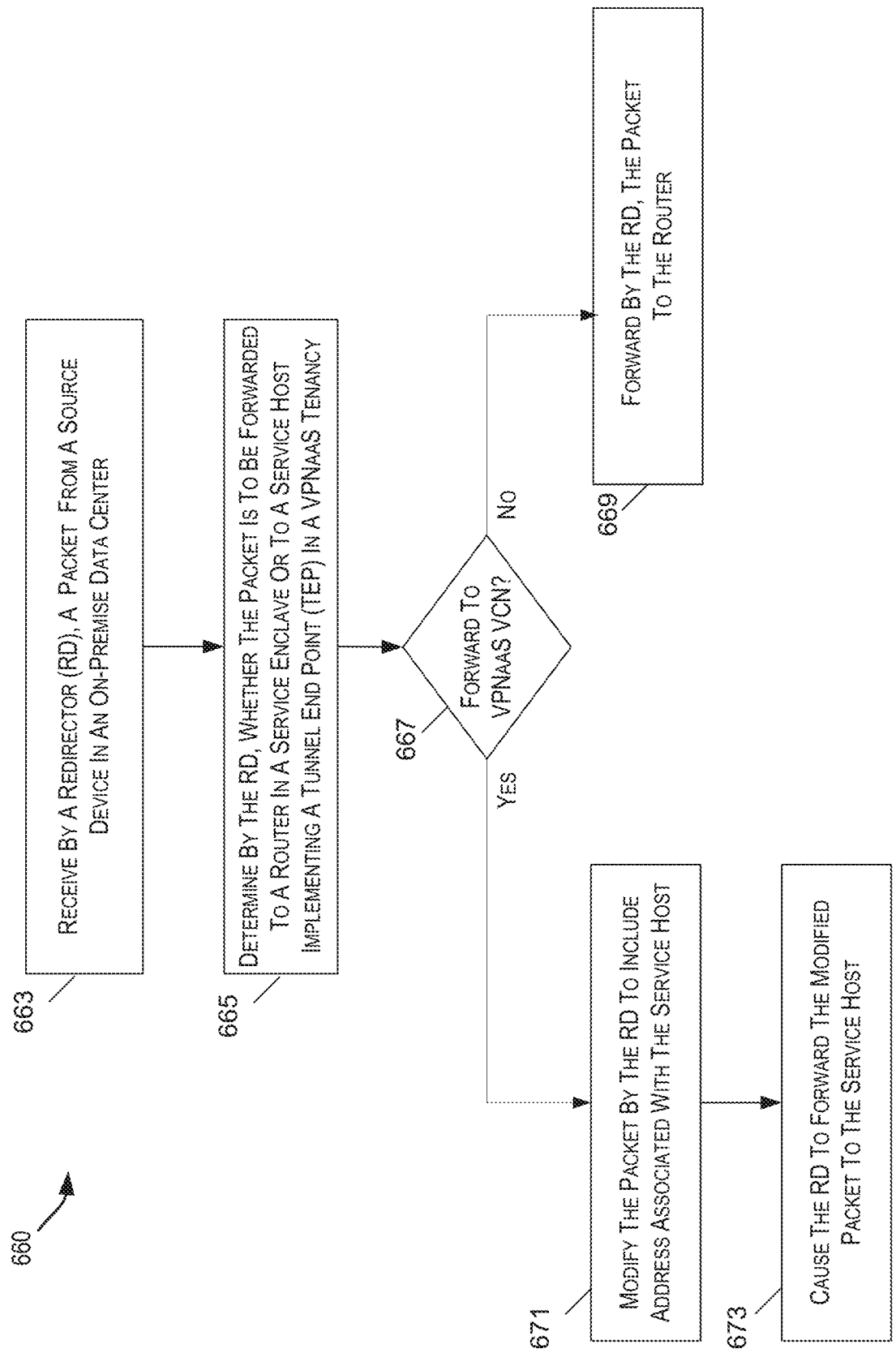
FIG. 6B illustrates a simplified flowchart depicting steps performed by a redirector, according to certain embodiments.

FIG. 6B illustrates a simplified flowchart 660 depicting steps performed by a redirector, according to certain embodiments. The processing depicted in FIG. 6B may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 6B and described below is intended to be illustrative and non-limiting. Although FIG. 6B depicts the various processing steps occurring in a particular sequence or order, this is not intended to be limiting. In certain alternative embodiments, the steps may be performed in some different order or some steps may also be performed in parallel.

The process commences in step 663, where the redirector receives a packet from a source device (e.g., CPE) in an on-premises data center. In step 665, the redirector determines whether the packet is to be forwarded to a legacy router (deployed in a service enclave) or to a service host implementing a TEP that is deployed in a VPNaaS tenancy. In step 667, the redirector performs a query as to whether the packet is to be forwarded to the VPNaaS VCN. If the response to the query is affirmative, then the process moves to step 671. However, if the response to the query is negative, then the process moves to step 669.

In step 669, the redirector simply forwards the packet to the legacy router that is hosted in the same tenancy as the redirector i.e., the service enclave. Upon determining that the packet is to be forwarded to a service host in the VPNaaS tenancy, the redirector in step 671 modifies the packet. Specifically, the redirector updates a header of the packet that originally includes the destination IP address of the legacy router included in a destination address field to be set to the address of the service host. Thereafter, in step 673, the redirector forwards the modified packet to the service host deployed in the VPNaaS tenancy.

Figure 7:
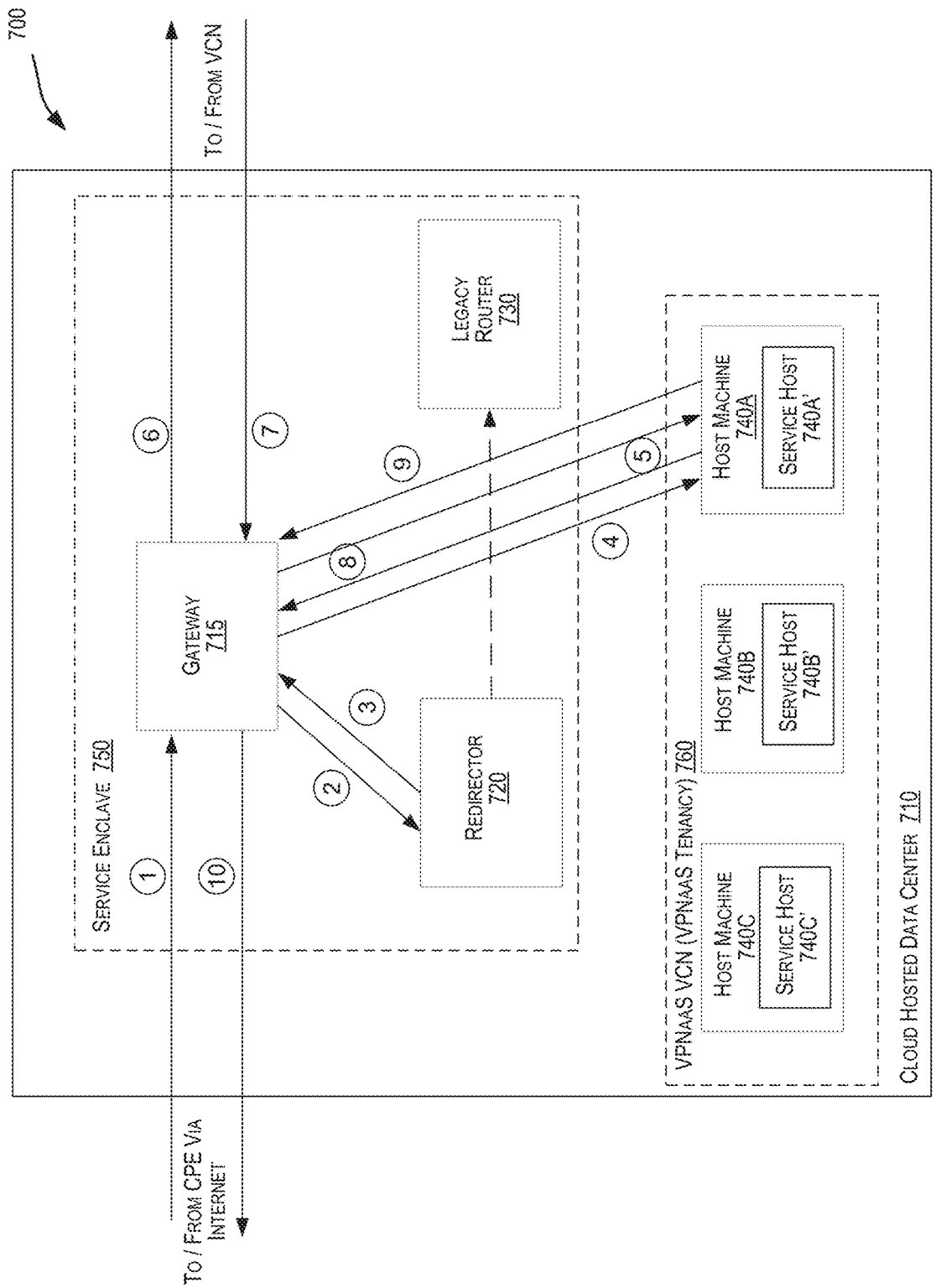
FIG. 7 depicts a block diagram illustrating routing of VPN traffic by the VPNaaS, according to certain embodiments.

FIG. 7 depicts a block diagram 700 illustrating routing of connection traffic (e.g., VPN connections) by the VPNaaS, according to certain embodiments. As shown in FIG. 7, a cloud hosted data center 710 includes a service enclave 750 and a VPNaaS tenancy i.e., VPNaaS VCN 760. The service enclave 710 includes a gateway 715, a redirector 720 and a legacy router 730. The VPNaaS tenancy 760 includes a plurality of host machines 740A-740C. Each host machine implements a service host, which in turn implements a set of one or more TEPs. As described herein, the role of the redirector 720 (included in the service enclave 750) is to migrate customer connections from the legacy router 730 to the VPNaaS tenancy 760 in an incremental manner (i.e., on a connection-by-connection basis). The connections are migrated without disrupting customer configurations that are set in place on the customer's side (e.g., without requiring customers to change the public IP address that they connect to.).

By one embodiment, the legacy router 730 is assigned a plurality of IP addresses. It is appreciated that a group of customers that intend to establish connections may share an IP address (i.e., a public IP address) assigned to the legacy router 730. Typically, the legacy router 730 utilizes an out-of-band border gateway protocol (BGP) to advertise (e.g., to the gateway 715) the IP address space handled by the router 730. In this manner, the gateway 715 forwards packets (e.g., data packets of a VPN connection) to the router 730 for further processing.

By one embodiment, the redirector 720 that is interposed between the gateway 715 and the legacy router 730, steals i.e., intercepts the information (e.g., IP address space) advertised by the router 730, and further advertises the same IP address space as preferred routes for connections terminating on that IP address space. In this manner, packets belonging to connections are forwarded by the gateway 715 to the redirector 720. In what follows, there is described a mechanism of routing traffic (i.e., VPN connections) performed by the redirector 720, which results in an efficient manner of migrating connections in an incremental manner.

Although FIG. 7 depicts a single redirector 720 and a single legacy router 730, it is appreciated that such a configuration is in no way limiting the scope of the present disclosure. Rather, one can have multiple redirectors associated with a group of legacy routers, or alternatively, have a single redirector associated with multiple legacy routers. However, for sake of illustration, the migration process is described below with reference to a single redirector i.e. redirector 720 and a single router i.e., legacy router 730.

As shown in FIG. 7, a data packet belonging to a particular connection arrives (from the CPE) at the gateway 715 via the Internet (i.e., arc labeled 1). A pair of IP addresses uniquely identifies a connection i.e., the connection can be uniquely identified by a source public IP address (i.e., public IP address of the CPE) and a destination public IP address (i.e., public IP address of the legacy router). The gateway 715 forwards the data packet to the redirector 720 (arc labeled 2).

The redirector 720 determines whether the packet is to be forwarded to the legacy router 730 or is to be forwarded to a service host being implemented on a host machine e.g., host machines 740A, 740B, or 740C. It is appreciated that the legacy router 730 resides in a first tenancy i.e., the service enclave 750, whereas the host machines implementing the corresponding service hosts reside in a second tenancy (i.e., VPNaaS tenancy 760) that is different from the first tenancy.

By one embodiment, the redirector 720 obtains the source public IP address and a destination public IP address included in a header of the packet. Further, the redirector 720 compares the obtained information i.e., the pair of source/destination IP addresses, with information associated with a plurality of connections maintained in a database e.g., a lookup table. Each of the plurality of connections is associated with a unique pair of IP addresses i.e., a source public IP address of the CPE from which the connection originates, and a destination IP address of the legacy router. The lookup table maintains connections that have been previously migrated to service hosts in the VPNaaS tenancy 760 e.g., a control plane of the VPNaaS tenancy has selected a particular service host to handle the connection.

The redirector 720 compares the pair of IP addresses associated with the packet to the pairs of IP addresses (associated with different connections) maintained in the lookup table. If the redirector 720 obtains a match, then the redirector 720 determines that the connection has been previously migrated, and forwards the packet to the service host that is being implemented on a host machine handling the connection. It is appreciated that a data plane of the VPnaaS may select a particular service host (implemented on a host machine) in a random manner to handle customer connection(s). However, if the redirector 720 does not find a match, then the redirector 720 forwards the packet to the legacy router 730 (shown in FIG. 7 by the dashed arc) that advertises the less-preferred route associated with the destination IP address.

In forwarding the packet to the service host, the redirector 720 does not simply forward the data packet directly to the service host. Rather, the redirector 720 forwards the data packet back to the gateway 715 (arc labeled 3), which in turn forwards the packet to the service host. This is done in order to account for high-availability and failover events. Specifically, the connection is not tied to a service host, but is rather tied to the destination IP address associated with the service host. Thus, in the scenario where a particular service host fails, the gateway 715 can select another service host (e.g., in a random manner) and move connections that were previously handled by that service host to a newly selected service host. In this manner, the VPNaaS system incurs the advantage of having high availability i.e., connections continue to be serviced seamlessly without customer downtime.

In forwarding the packet back to the gateway 715, the redirector 720 modifies a header of the packet. By one embodiment, the modification includes re-writing, by the redirector 720, the header of the data packet to include a source public IP address (i.e., the IP address of the CPE) and another IP address i.e., a destination IP address of the service host that has been selected to handle the customer connection. In other words, the redirector 720 changes the originally set destination IP address of the legacy router in the header to reflect the IP address of the service host. The gateway 715 upon receiving the packet, forwards the packet to the service host e.g., host machine 740A that implements the service host based on the IP address of the service host included in the header (arc labeled 4). Upon receiving the data packet, the service host 740A decrypts the packet (and performs additional functions, which are described later with reference to FIG. 10), and forwards the packet to the gateway 715 (arc labeled 5). The gateway 715 upon receiving the packet forwards the packet to a customer's cloud network (i.e., VCN), as shown by arc labeled 6.

In delivering traffic from the customers cloud network i.e., VCN, the gateway 715 receives unencrypted packets from the VCN (arc labeled 7). The gateway 715 forwards the packets (arc labeled 8) to the service host handling the connection e.g., host machine 740A implementing the service host, which encrypts the packets and sends the packet back to the gateway 715 (arc labeled 9). Thereafter, the gateway 715 forwards the encrypted data packet on the Internet (arc labeled 10), to be eventually forwarded to the CPE. According to some embodiments, it is appreciated that once all connections destined to a particular destination IP address (of a legacy router) have been migrated by the redirector to service host(s), the redirector 720 may be disabled, and the service host(s) (handling the connection(s)) can directly advertise the IP address(es) to the gateway 715. In this manner, the VPNaaS can utilize computing resources in an efficient manner.

Figure 8:
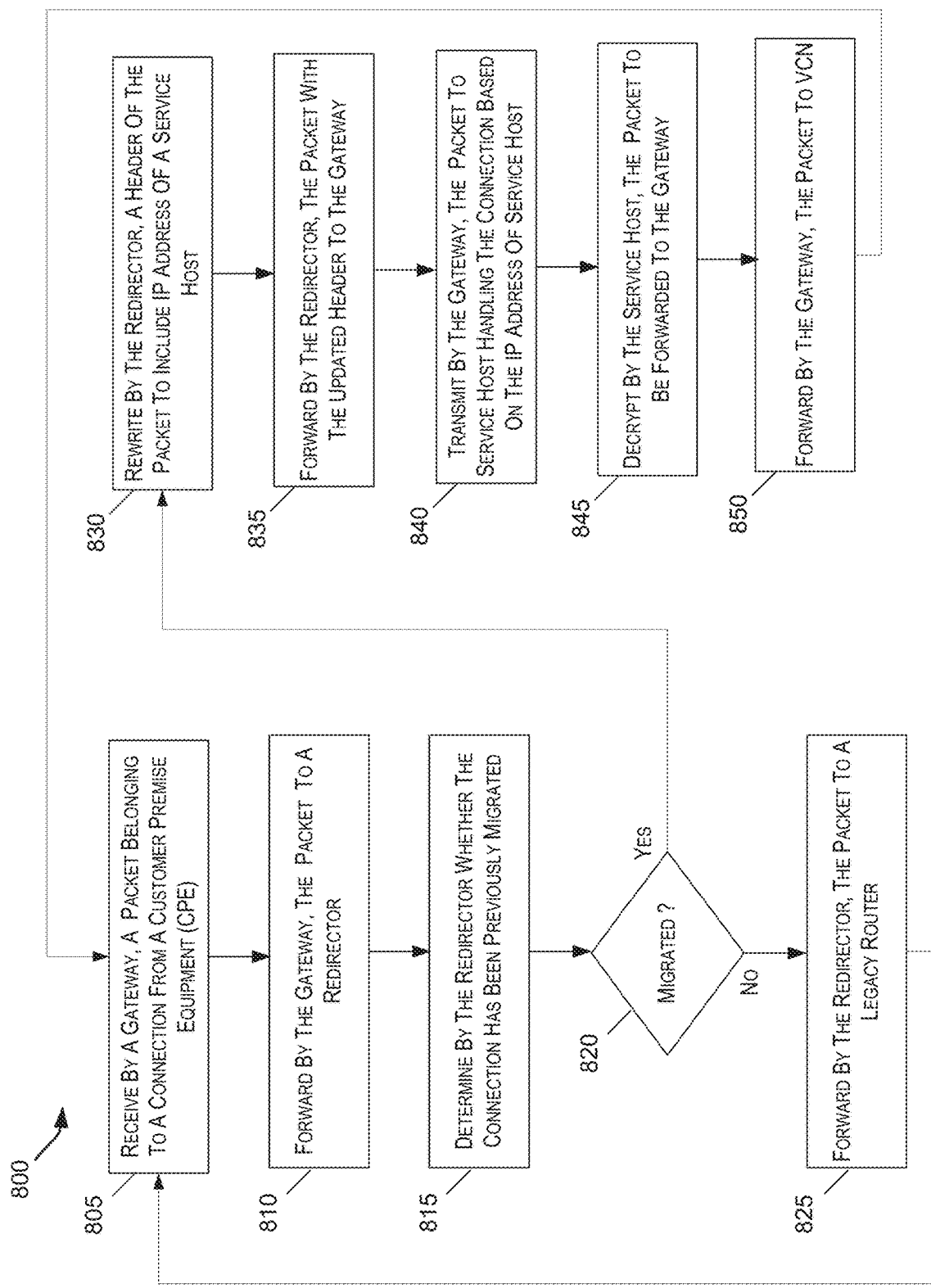
FIG. 8 illustrates a simplified flowchart depicting steps performed by VPNaaS, according to certain embodiments.

FIG. 8 illustrates a simplified flowchart 800 depicting steps performed by VPNaaS, according to certain embodiments. The processing depicted in FIG. 8 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 8 and described below is intended to be illustrative and non-limiting. Although FIG. 8 depicts the various processing steps occurring in a particular sequence or order, this is not intended to be limiting. In certain alternative embodiments, the steps may be performed in some different order or some steps may also be performed in parallel.

The process commences in step 805, where a gateway (e.g., gateway 715 in FIG. 7) receives, via the Internet, a packet belonging to a connection (e.g., an IPsec connection) from a customer premise equipment (CPE). It is noted that the connection is uniquely identifiable based on a pair of IP addresses i.e., a source public IP address of the CPE and a destination public IP address (e.g., public IP address of the legacy router 730). In step 810, the gateway forwards the received packet to a redirector (e.g., redirector 720 in FIG. 7).

In step 815, the redirector determines whether a connection (i.e., the connection including the packet) has been previously migrated to a service host. In order to make such a determination, the redirector compares the pair of IP addresses associated with the packet to pairs of IP addresses (associated with different connections) maintained in the lookup table. If the redirector obtains a match, the redirector determines successfully that the connection has been previously migrated to a service host. In step 820, the redirector performs a query to determine whether the connection has been previously migrated to the service host. If the response to the query is affirmative, the process moves to step 830. However, is the response to the query is negative, the process moves to step 825.

In step 825, the redirector forwards the packet to the legacy router (e.g., router 730) that advertises the less-preferred route associated with the destination IP address. Thereafter, the process loops back to step 805 to process the next connection/packet. Upon determining that the connection has been previously migrated to a VPNaaS host, the process in steps 830-850, performs operations that enable the packet to be forwarded to the VPNaaS host in a seamless manner.

In step 830, the redirector modifies a header of the packet. By one embodiment, the modification includes re-writing, by the redirector, the header of the packet to include a source public IP address (i.e., the IP address of the CPE) and another IP address i.e., a destination IP address of the service host that is selected to handle the customer connection. In step 835, the redirector forwards the packet (with the updated/modified header) to the gateway. In step 840, the gateway transmits the packet to the service host based on the IP address of the service host included in the header of the packet (performed in step 830).

The process then moves to step 845, where the service host decrypts (and performs additional functions that are described later with reference to FIG. 10), and forwards the packet to the gateway. The gateway in step 850 forwards the packet to a customer's cloud network i.e., VCN. Thereafter, the process loops back to step 805 to process the next packet/connection.

Figure 9A:
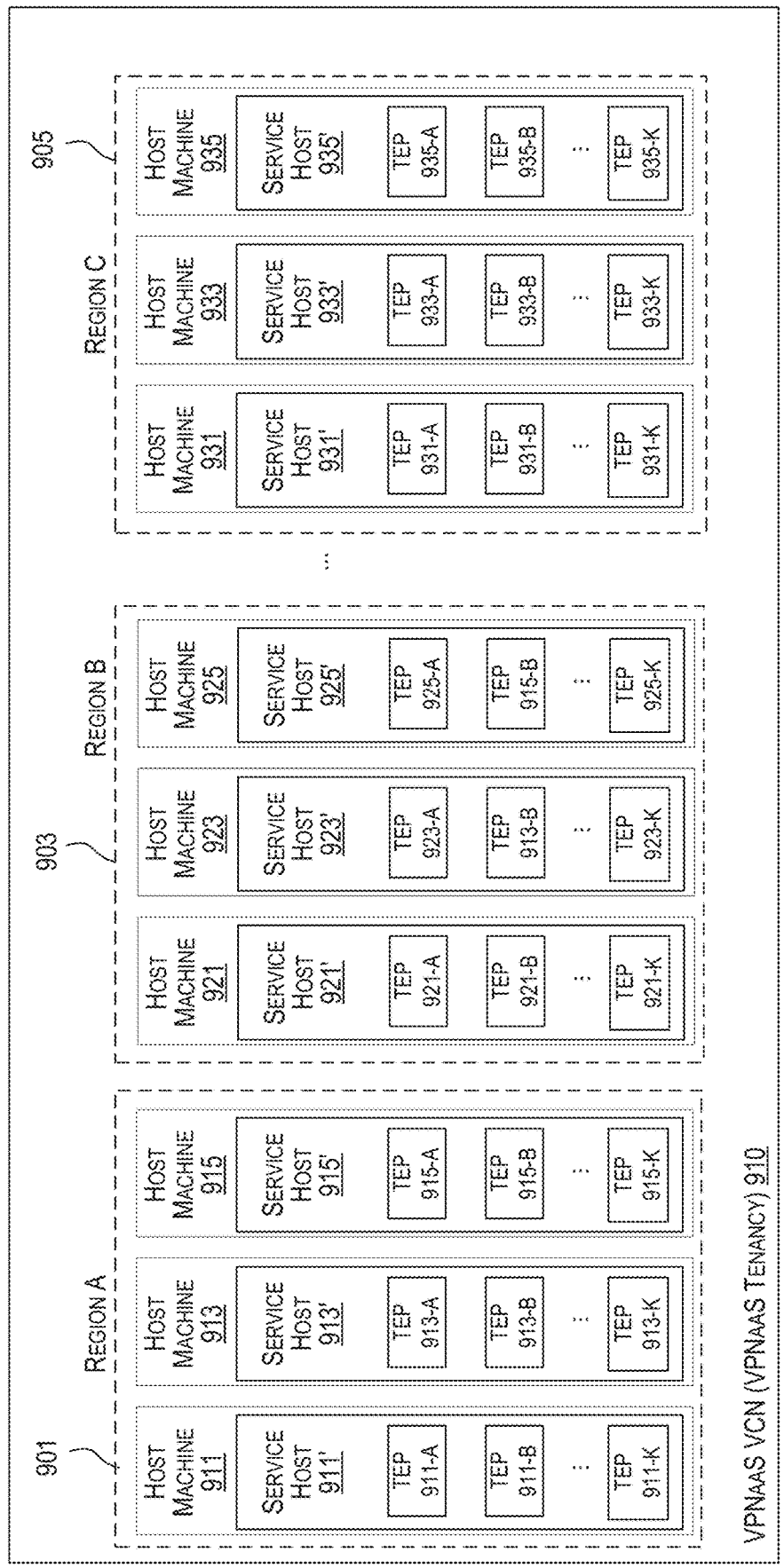
FIG. 9A depicts an exemplary architecture of VPNaaS VCN according to certain embodiments.

FIG. 9A depicts an exemplary architecture 900 of VPNaaS VCN i.e., VPNaaS tenancy according to certain embodiments. By some embodiments, the VPNaaS tenancy 910 includes clusters of host machines. Each host machine implements a service host (i.e., a general-purpose compute instance that is implemented in software to terminate customer connections), which implements a set of one or more tunnel end-points (TEPs). Each TEP implemented by the service host terminates a customer connection. By some embodiments, the service host can be a virtual machine (VM) or a bare metal host that is executed in the overlay i.e., the VPNaaS tenancy. Further, each TEP may correspond to a container that is executed on the service host.

A group of host machines i.e., a cluster of host machines may be assigned to serve i.e., terminate connections (e.g., VPN connections) originating from different CPEs in a geographical area. For example, FIG. 9A depicts three clusters 901, 903, and 905, each of which includes a plurality of host machines. The clusters are assigned to serve connections originating from regions A, B, and C, respectively. As shown in FIG. 9A, the host machine 911 (belonging to cluster 901) includes a service host 911' that implements K TEPs 911-A to 911K. It is appreciated that although each host machine depicted in FIG. 9A is shown to include a service host that implements K TEPs, this is in no way limiting the scope of the present disclosure. The respective service hosts of the host machines 911, 913, 915, 921, 923, 925, 931, 933, and 935 may implement different number of TEPs. Moreover, each cluster may include a different number of host machines. Each service host is programmed to terminate multiple customer connections (associated with one or more customers) on the TEPs (i.e., one connection per TEP) implemented by the service host.

Figure 9B:
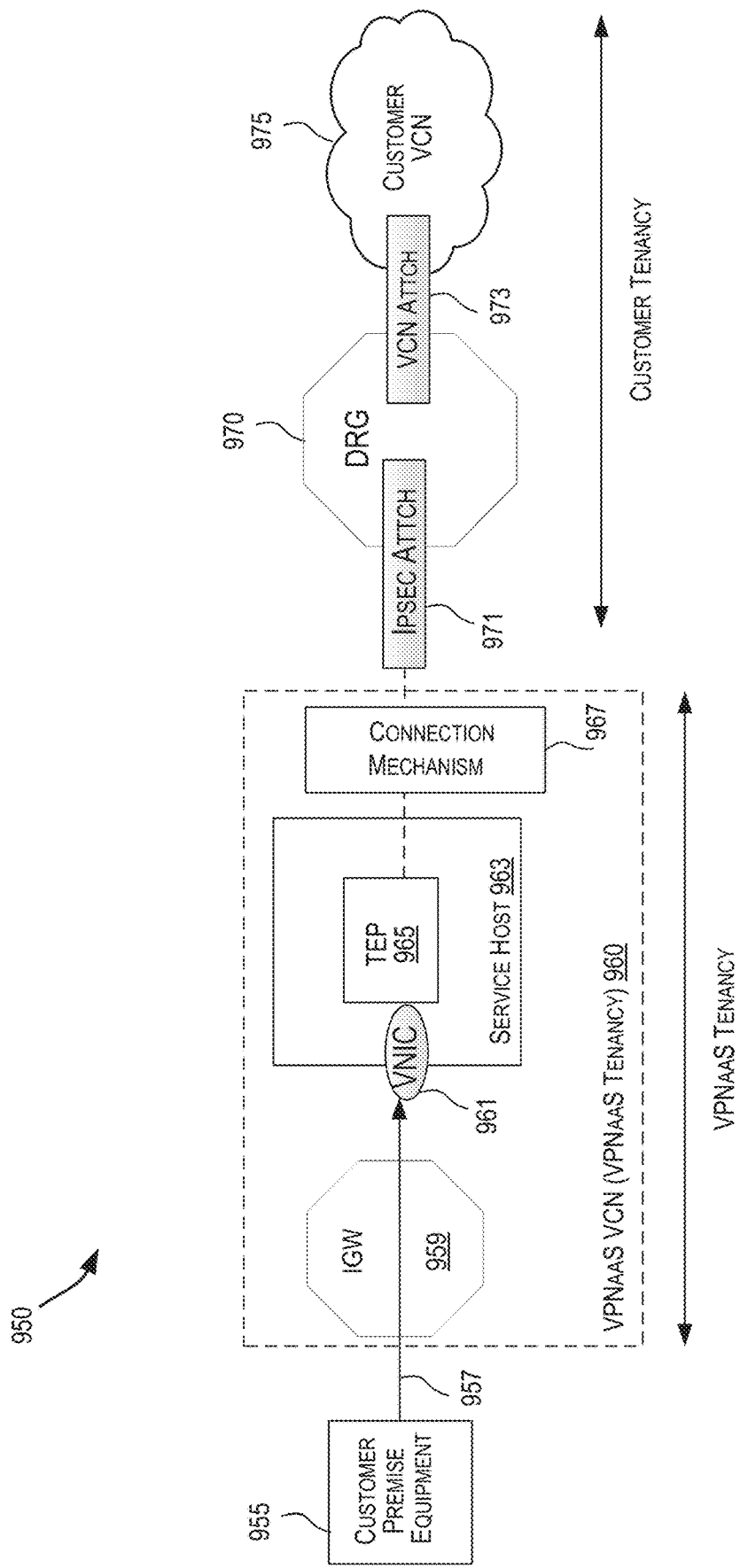
FIG. 9B depicts an exemplary block diagram of a virtual private network (VPN) customer model, according to certain embodiments.

FIG. 9B depicts an exemplary block diagram 950 of a virtual private network (VPN) customer model, according to certain embodiments. As shown in FIG. 9B, a connection 957 (e.g., an IPsec connection or an IPsec tunnel) originates at a customer premise equipment 955. The connection 957 is routed via an Internet gateway (IGW) 959 and a virtual network interface card (VNIC) 961 (associated with a service host 963), and is terminated at an end-point (e.g., tunnel end-point (TEP) 965) that is implemented by the service host 963. By one embodiment, the TEP 965 corresponds to a container executed by software on the service host 963. It is noted that the service host 963 may include a plurality of TEPs (as shown in FIG. 9A), each of which is programmed to terminate at most one connection.

The connection is to be eventually routed to a destination that resides in a customer VCN 975. By one embodiment, the customer VCN 975 is communicatively coupled with a dynamic routing gateway (DRG) 970, via a VCN attachment 973. The DRG 970 further includes an IPsec attachment 971 that communicatively couples the DRG 970 to the service host 963. As shown in FIG. 9B, the service host 963 along with the IGW 959 resides in a first tenancy e.g., the VPNaaS tenancy 960, whereas the DRG 970 that is communicatively coupled to the customer VCN 975 resides in a second tenancy (e.g., customer tenancy) that is different than the first tenancy.

In such a configuration, a challenge is to determine as to how the connection is to be forwarded from the first tenancy to the second tenancy. To address the challenge, the present disclosure provides for a connection mechanism 967 (included in the VPNaaS tenancy 960) that enables traffic (e.g., packets belonging to a connection) to be forwarded from the first tenancy (i.e., service tenancy) to the second tenancy (i.e., customer tenancy), and vice versa. In other words, for an incoming packet, the VPNaaS tenancy 960 has to inject the packet into the DRG 970 residing in the customer tenancy through the IPsec attachment 971. In the other direction, when traffic is routed from the DRG 970 out through the IPsec attachment 971, the DRG 970 needs to be able to forward that packet to the TEP 965 implemented on the service host 963. As will be described below, the connection mechanism 967 provides techniques i.e., means that provision packets to be forwarded from the service host 963 to the DRG 970 and vice versa.

It is noted that there are existing mechanisms (e.g., service gateway (SGW), PE-VNIC, cross-tenancy-attached VNIC, etc.,) of moving packets across different tenancies. However, none of existing mechanisms are suitable for the particular use case as depicted in FIG. 9B. This is because of the problem of conflicting address spaces. Specifically, for customer packets that are received at the TEP 965, there is no way to guarantee that a classless inter-domain routing (CIDR) address range used by the packets does not conflict with the CIDR of the VPNaaS VCN 960. As such, in the incoming direction, when a customer packet gets decrypted and de-capsulated at the TEP 965, it is likely that the packet conflicts with addresses in the VPNaaS VCN CIDR.

To overcome this problem, by one embodiment, the connection mechanism 967 provides for a direct-attached VNIC (referred to herein as DAV) associated with the service host 967. The DAV is a type of VNIC that can be implemented by a smart NIC and provisions for connecting an overlay tunnel to a DRG attachment. By some embodiments, the TEP 965 that is implemented on the service host 963 adds a label to the packet to be delivered to the second tenancy. Upon adding the label, the TEP 965 forwards the packet to the DAV. The DAV modifies a header of the incoming packets (from the TEP 965) to ensure that the packets can be switched/forwarded to their respective IPsec attachments based on the modifications performed to the packet headers. In what follows, there is described with reference to FIG. 10, details pertaining to the operations of the TEP and the DAV that enable packets of a connection to be switched/forwarded from the service host 963 residing in the service tenancy to the IPsec attachment 971 of the DRG 970 hosted in the customer tenancy.

Figure 9C:
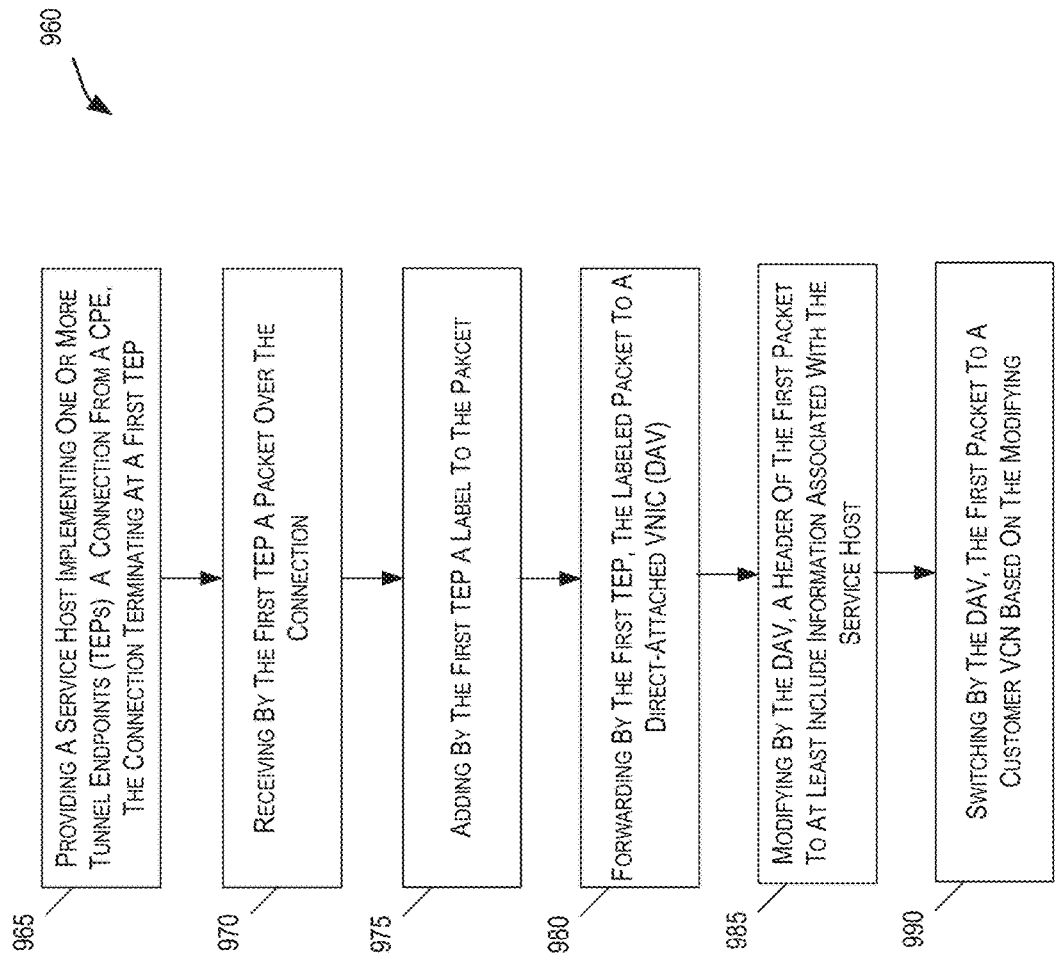
FIG. 9C illustrates a simplified flowchart depicting steps performed by a service host, according to certain embodiments.

FIG. 9C illustrates a simplified flowchart 960 depicting steps performed by a service host, according to certain embodiments. The processing depicted in FIG. 9C may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 9C and described below is intended to be illustrative and non-limiting. Although FIG. 9C depicts the various processing steps occurring in a particular sequence or order, this is not intended to be limiting. In certain alternative embodiments, the steps may be performed in some different order or some steps may also be performed in parallel.

The process commences in step 965, where a host machine that implements a service host, which in-turn implements a set of one or more TEPs is provided a connection. The connection originates from a customer on-premises equipment residing in a customer data center. Note that the connection terminates at one of the TEPs (e.g., a first TEP) that is implemented on the service host. In step 970, the first TEP receives a packet over the connection. In step 975, the first TEP assigns a label to the packet. It is appreciated that the label may correspond to, for instance, an MPLS label, where each TEP of the service host is assigned a unique label.

The process then moves to step 980, where the first TEP forwards the labeled packet to a direct-attached VNIC associated with the service host. As will be described later with reference to FIG. 10, the forwarding of the packet may be performed via a communication tunnel e.g., an MPLS tunnel established between the first TEP and the DAV.

Upon receiving the labeled packet, the DAV in step 985 modifies a header of the packet to include at least information associated with the service host. By some embodiments, the information may include at least an ID associated with the DAV, the label assigned by the TEP to the DAV, etc. Thereafter, in step 990, based on the modified header, the DAV switches the first packet to a customer VCN.

Figure 10:
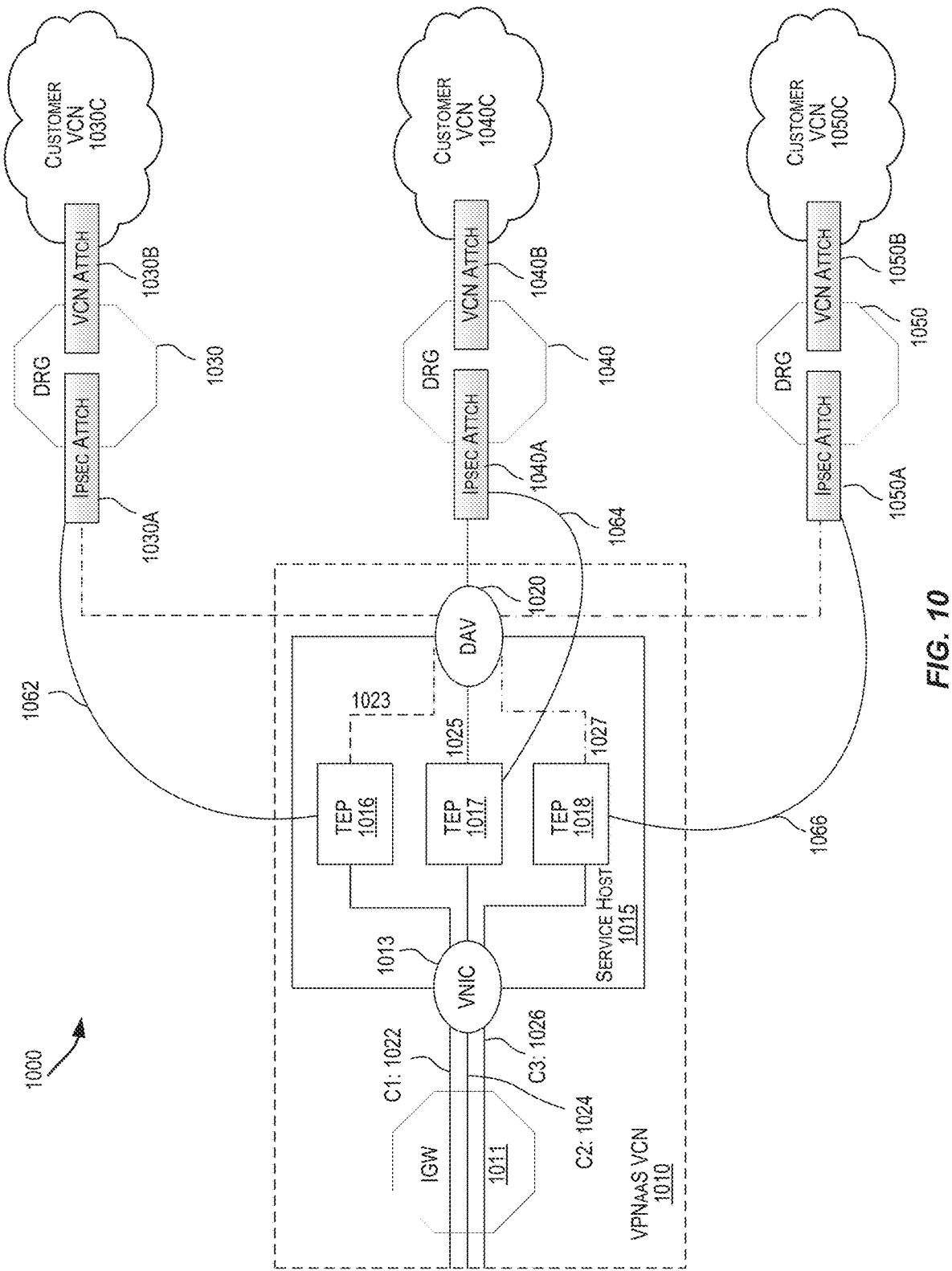
FIG. 10 depicts an exemplary configuration illustrating an implementation of a direct-attached virtual network interface card (DAV), according to certain embodiments.

FIG. 10 depicts an exemplary configuration illustrating an implementation of a direct-attached virtual network interface card (DAV) 1000, according to certain embodiments.

As shown in FIG. 10, a VPNaaS tenancy i.e., VPNaaS VCN 1010 includes an internet gateway 1011, a VNIC 1026 associated with the gateway 1011, a service host 1015 implementing a plurality of TEPs e.g., TEPs 1016, 1017, and 1018, and a DAV 1020. It is noted that a host machine implements the service host 1015. For sake of illustration, FIG. 10 illustrates three connections labeled C1 (1022), C2 (1024), and C3 (1026) that are to be respectively forwarded to different customer VCNs i.e., to different IPsec attachment of different gateways associated with the customer VCNs. For instance, connection C1 (1022) is to be forwarded to the IPsec attachment 1030A of DRG 1030, connection C2 (1024) is to be forwarded to the IPsec attachment 1040A of DRG 1040, and connection C3 (1026) is to be forwarded to the IPsec attachment 1050A of DRG 1050, respectively. By some embodiments, the DAV 1020 maintains a list of mappings of the incoming connections and the IPsec attachments that each connection is to be forwarded to.

Traffic i.e., packets on the three connections i.e., C1 (1022), C2 (1024), and C3 (1026) arrive at the service host using the same public IP address i.e., the IP address of the service host 1015. Based on the source IP address included in each packet belonging to a particular connection, the VNIC 1013 routes the packet to a specific TEP implemented by the service host 1015. Note that each TEP terminates at most one connection. In this manner, based on the source IP address included in the packet headers, the VNIC 1013 source-routes the packets to the appropriate TEPs. For example, packets belonging to connection C1 (1022) are sourced-routed by the VNIC 1013 to be terminated at TEP 1016, whereas packets belonging to connection C2 (1024) are sourced-routed by the VNIC 1013 to be terminated at TEP 1017, and packets belonging to connection C3 (1026) are sourced-routed by the VNIC 1013 to be terminated at TEP 1018.

By some embodiments, encrypted packets belonging to a particular connection (originating at a source device e.g., CPE in the customer on-premises data center) are terminated at a TEP implemented on the service host. For instance, a packet that arrives at the TEP has a packet within a packet (i.e., the packet is already encapsulated and encrypted). At the TEP, the packet is decrypted and de-capsulated (e.g., outer header is removed) exposing the inner payload packet, which is to be sent to a customer VCN i.e., attachment associated with a DRG corresponding with the customer VCN. Each TEP of the host machine 1015 e.g., TEP 1016, 1017, or 1018, is assigned a unique label e.g., an MPLS label. Each TEP, for example, TEP 1016 applies its assigned MPLS label to each packet that it receives and forward the labeled packet via a communication tunnel e.g., an MPLS tunnel, to the DAV 1020. For example, TEP 1016 applies an MPLS label to each packet (of a connection) it receives and forward the labeled packet via an MPLS tunnel 1023 to the DAV 1020. Similarly, TEPs 1017 and 1018 also apply their respective MPLS labels to the respective packets they receive, and forward the packets on MPLS tunnels (i.e., tunnel 1025 and 1027, respectively) to the DAV 1020.

When the DAV 1020 receives a particular packet e.g., packet belonging to connection C1: 1022, which is labeled with the MPLS label assigned to TEP 1016 and arrives at the DAV 1020 via the MPLS tunnel 1023, the DAV removes the label from the packet. Further, the DAV modifies a header of the packet to include at least the following information: (i) the label i.e., the MPLS label, (ii) a slot ID assigned to the DAV, and (iii) another header e.g., an UDP header, where the destination field is set to the address of the respective DRG the packet is to be forwarded to i.e., for the packet belong to connection C1 1022, the UDP header includes the address of DRG 1030.

The DAV 1020 performs similar operations for packets belong to connections C2 (1024) and C3 (1026), respectively. In this manner, the DAV 1020 performs switch routing of packets to their respective IPsec attachments on the DRGs based at least on the label included in the modified headers of the packets. For example, the DAV 1020 switch-routes: packets belonging to C1 (1022) to IPsec attachment 1030A of DRG 1030, packets belonging to C2 (1024) to IPsec attachment 1040A of DRG 1040, and packets belonging to C3 (1026) to IPsec attachment 1050A of DRG 1050. The packets are routed by the respective DRGs to their respective customer VCNs via VCN attachments associated with the DRGs. For example, DRG 1030 forwards packets of connection C1 (1022) using VCN attachment 1030B to customer VCN 1030C. In a similar manner, DRG 1040 forwards packets of connection C2 (1024) using VCN attachment 1040B to customer VCN 1040C, and DRG 1050 forwards packets of connection C3 (1026) using VCN attachment 1050B to customer VCN 1050C.

By some embodiments, each of the TEPs of the service host 1015 communicates (using an out-of-band BGP protocol) with their respective IPsec attachments to exchange route information. For example, TEP 1016 communicates with IPsec attachment 1030A using BGP (represented by arc 1062), while TEP 1017 communicates with IPsec attachment 1040A using BGP (represented by arc 1062), and TEP 1018 communicates with IPsec attachment 1050A using BGP (represented by arc 1066). In the routes advertised by each TEP (to the respective IPsec attachments), the message exchanged includes at least the label assigned to the TEP, the slot ID of the DAV 1020, and a substrate address of the DAV 1020 e.g., IP address a smartNIC implementing the DAV. This information may be used by packets originating from the customer VCNs e.g., customer VCNs 1030C, 1040C, and 1050C that are to be sent to the service host 1015 in order to be routed to their respective CPEs. In this manner, the DAV 1020 enables tunneling of packets though an overlay while avoiding the previously described address space conflict issues. In what follows, there are described flowcharts depicting the processing performed by the DAV in forwarding packets in a first direction i.e., packets originating at CPE and destined for customer VCNs, and in a second direction i.e., packets originating from customer VCNs and directed to CPEs.

Figure 11A:
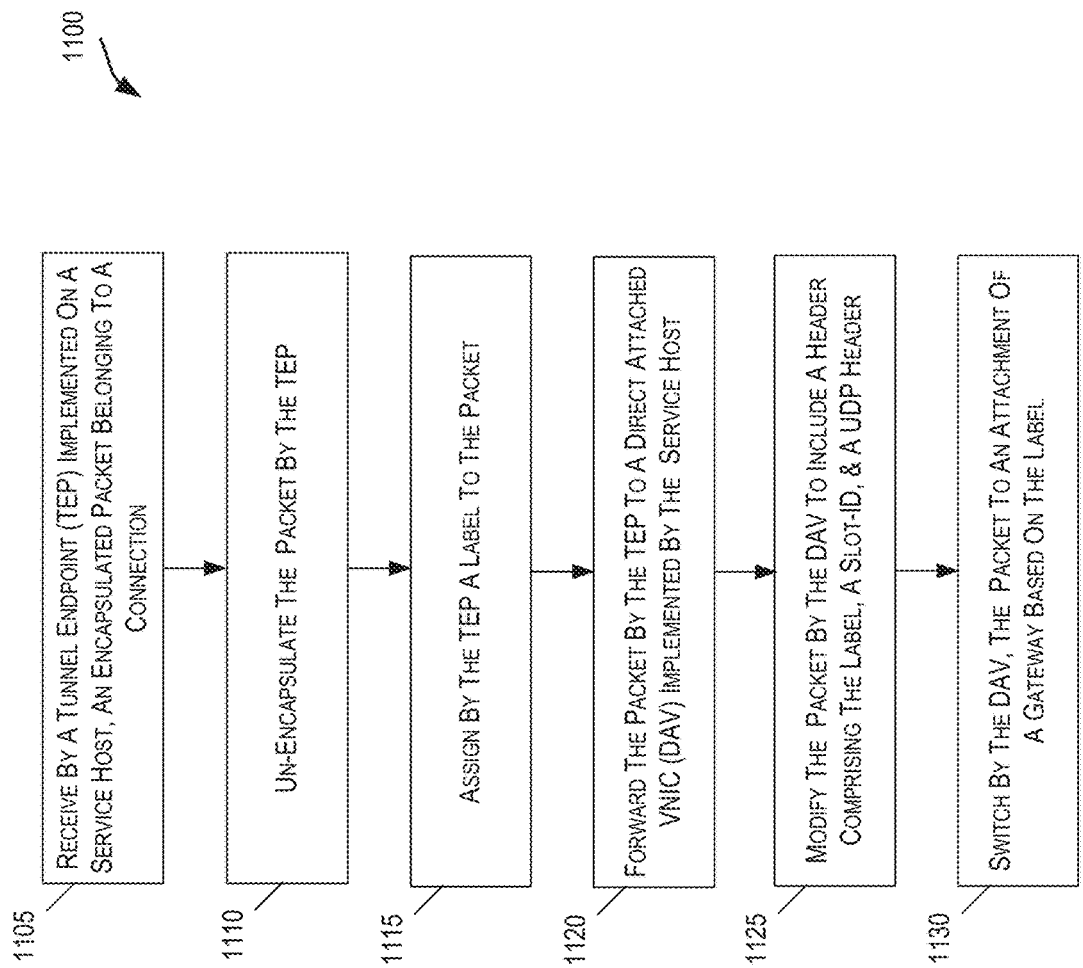
FIG. 11A illustrates a simplified flowchart depicting steps performed by a service host in forwarding data packets from a customer premise equipment (CPE) to a customer's virtual cloud network (VCN), according to certain embodiments.

FIG. 11A illustrates a simplified flowchart 1100 depicting steps performed by a service host in forwarding packets from a customer premise equipment (CPE) to a customer's virtual cloud network (VCN), according to certain embodiments. The processing depicted in FIG. 11A may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 11A and described below is intended to be illustrative and non-limiting. Although FIG. 11A depicts the various processing steps occurring in a particular sequence or order, this is not intended to be limiting. In certain alternative embodiments, the steps may be performed in some different order or some steps may also be performed in parallel.

The process commences in step 1105, where a TEP implemented on a service host receives an encapsulated (and encrypted) packet belong to a connection (e.g., a connection which originates at a CPE and is terminated at the TEP implemented on the service host in the VPNaaS tenancy). In step 1110, the TEP de-encapsulates (and decrypts) the packet and assigns a label e.g., MPLS label, to the packet in step 1115.

In step 1120, the TEP forwards the labeled packet to a DAV implemented on the service host. For example, the TEP utilizes a communication tunnel e.g., MPLS tunnel created between the TEP and the DAV to forward the packet to the DAV. Upon receiving the packet, the DAV in step 1125, modifies a header of the packet to include at least the following information: (i) the label of the TEP i.e., the MPLS label, (ii) a slot ID assigned to the DAV, and (iii) another header e.g., an UDP header, where the destination field is set to the address of the respective DRG the packet is to be forwarded to. Upon modifying the packet, the DAV in step 1130 switches the packet to the attachment associated with the DRG based at least on the label included in the header of the packet.

FIG. 11B illustrates another simplified flowchart 1150 depicting steps performed by a service host in forwarding data packets originating from the customer's VCN and directed to the CPE, according to certain embodiments. The processing depicted in FIG. 11B may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 11B and described below is intended to be illustrative and non-limiting. Although FIG. 11B depicts the various processing steps occurring in a particular sequence or order, this is not intended to be limiting. In certain alternative embodiments, the steps may be performed in some different order or some steps may also be performed in parallel.

The process commences in step 1155, where an attachment of a gateway (associated with a customer's VCN) obtains information from a TEP that is implemented by a service host. For instance, the TEP and the attachment may communicate via protocols such as BGP. The information obtained by the attachment can include, for instance, at least the label assigned to the TEP, the slot ID of the DAV, and a UDP header including the substrate address of the DAV. In step 1160, the gateway associated with the customer's VCN obtains a packet that is to be transmitted to a customer's CPE. In step 1165, the gateway modifies a header of the packet to include the information obtained in step 1160. Specifically, the gateway modifies the header of the packet to include the label (associated with the TEP implemented on the service host) and the slot ID of the DAV. The gateway further adds a sub-header to the packet to include the UDP header i.e., the substrate address of the DAV e.g., an IP address of a smart NIC that implements the DAV.

In step 1170, the gateway transmits the modified packet to the DAV associated with the service host via an attachment (e.g., IPsec attachment) that communicatively couples the gateway to the service host. Upon receiving the packet, the DAV in step 1175 processes the packet to extract first information included in the header of the packet. By some embodiments, the DAV removes the UDP header from the packet and extracts the label and slot ID information from the packet. Thereafter, the DAV updates the header of the packet to include the extracted label. In step 1180, the DAV switches the packet to the corresponding TEP implemented on the service host based on the extracted label. In step 1185, upon the TEP receiving the packet, the TEP removes the label from the header of the packet. By some embodiments, the TEP encrypts the packet and transmits the encrypted packet to the CPE via a public network e.g. Internet.

Example Cloud Infrastructure Embodiment

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 12:
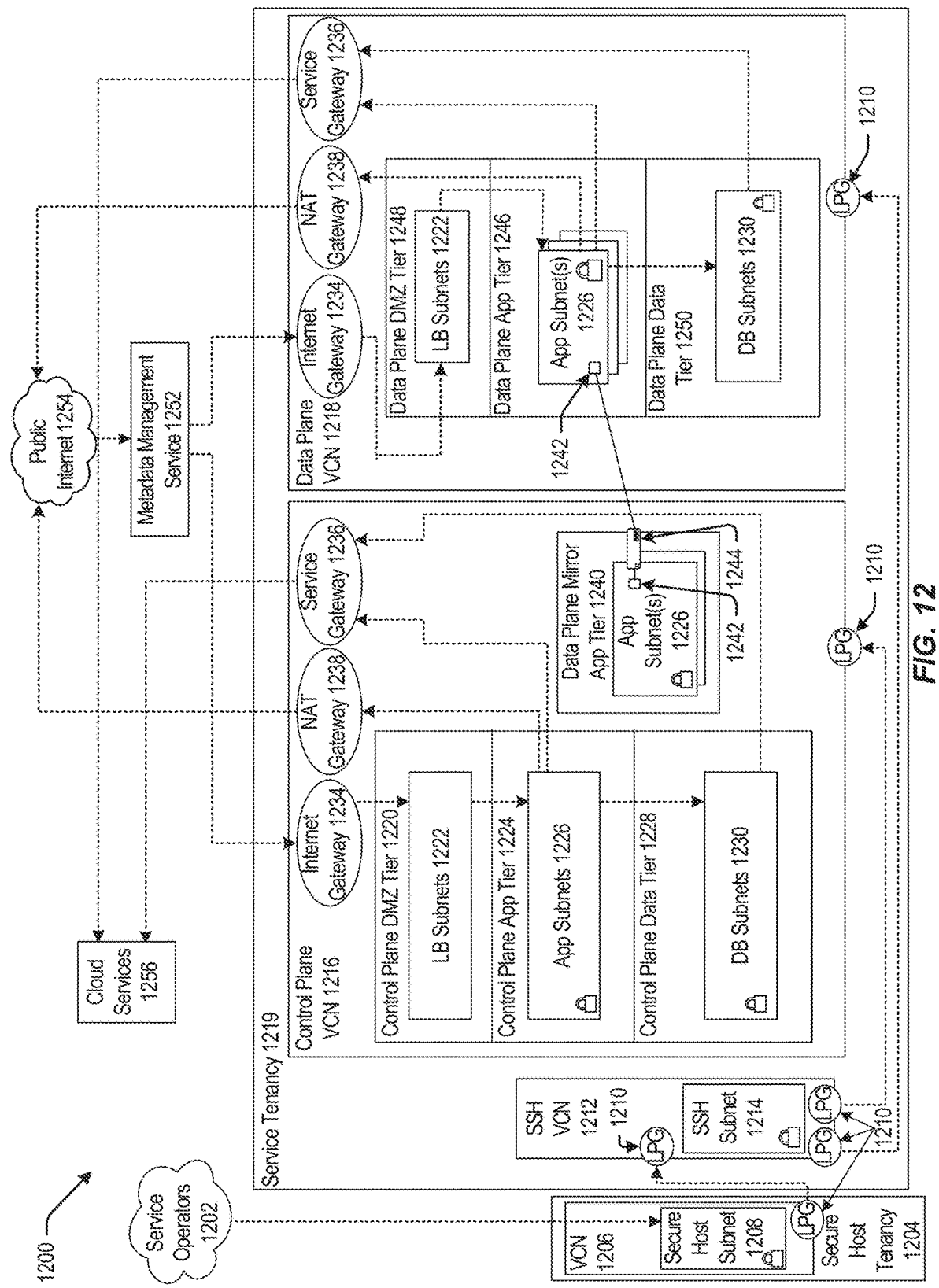
FIG. 12 is a block diagram illustrating one pattern for implementing a cloud infrastructure as a service system, according to at least one embodiment.

FIG. 12 is a block diagram 1200 illustrating an example pattern of an IaaS architecture, according to at least one embodiment. Service operators 1202 can be communicatively coupled to a secure host tenancy 1204 that can include a virtual cloud network (VCN) 1206 and a secure host subnet 1208. In some examples, the service operators 1202 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1206 and/or the Internet.

The VCN 1206 can include a local peering gateway (LPG) 1210 that can be communicatively coupled to a secure shell (SSH) VCN 1212 via an LPG 1210 contained in the SSH VCN 1212. The SSH VCN 1212 can include an SSH subnet 1214, and the SSH VCN 1212 can be communicatively coupled to a control plane VCN 1216 via the LPG 1210 contained in the control plane VCN 1216. Also, the SSH VCN 1212 can be communicatively coupled to a data plane VCN 1218 via an LPG 1210. The control plane VCN 1216 and the data plane VCN 1218 can be contained in a service tenancy 1219 that can be owned and/or operated by the IaaS provider.

The control plane VCN 1216 can include a control plane demilitarized zone (DMZ) tier 1220 that acts as a perimeter network (e.g., portions of a corporate network between the corporate intranet and external networks). The DMZ-based servers may have restricted responsibilities and help keep security breaches contained. Additionally, the DMZ tier 1220 can include one or more load balancer (LB) subnet(s) 1222, a control plane app tier 1224 that can include app subnet(s) 1226, a control plane data tier 1228 that can include database (DB) subnet(s) 1230 (e.g., frontend DB subnet(s) and/or backend DB subnet(s)). The LB subnet(s) 1222 contained in the control plane DMZ tier 1220 can be communicatively coupled to the app subnet(s) 1226 contained in the control plane app tier 1224 and an Internet gateway 1234 that can be contained in the control plane VCN 1216, and the app subnet(s) 1226 can be communicatively coupled to the DB subnet(s) 1230 contained in the control plane data tier 1228 and a service gateway 1236 and a network address translation (NAT) gateway 1238. The control plane VCN 1216 can include the service gateway 1236 and the NAT gateway 1238.

The control plane VCN 1216 can include a data plane mirror app tier 1240 that can include app subnet(s) 1226. The app subnet(s) 1226 contained in the data plane mirror app tier 1240 can include a virtual network interface controller (VNIC) 1242 that can execute a compute instance 1244. The compute instance 1244 can communicatively couple the app subnet(s) 1226 of the data plane mirror app tier 1240 to app subnet(s) 1226 that can be contained in a data plane app tier 1246.

The data plane VCN 1218 can include the data plane app tier 1246, a data plane DMZ tier 1248, and a data plane data tier 1250. The data plane DMZ tier 1248 can include LB subnet(s) 1222 that can be communicatively coupled to the app subnet(s) 1226 of the data plane app tier 1246 and the Internet gateway 1234 of the data plane VCN 1218. The app subnet(s) 1226 can be communicatively coupled to the service gateway 1236 of the data plane VCN 1218 and the NAT gateway 1238 of the data plane VCN 1218. The data plane data tier 1250 can also include the DB subnet(s) 1230 that can be communicatively coupled to the app subnet(s) 1226 of the data plane app tier 1246.

The Internet gateway 1234 of the control plane VCN 1216 and of the data plane VCN 1218 can be communicatively coupled to a metadata management service 1252 that can be communicatively coupled to public Internet 1254. Public Internet 1254 can be communicatively coupled to the NAT gateway 1238 of the control plane VCN 1216 and of the data plane VCN 1218. The service gateway 1236 of the control plane VCN 1216 and of the data plane VCN 1218 can be communicatively couple to cloud services 1256.

In some examples, the service gateway 1236 of the control plane VCN 1216 or of the data plane VCN 1218 can make application programming interface (API) calls to cloud services 1256 without going through public Internet 1254. The API calls to cloud services 1256 from the service gateway 1236 can be one-way: the service gateway 1236 can make API calls to cloud services 1256, and cloud services 1256 can send requested data to the service gateway 1236. But, cloud services 1256 may not initiate API calls to the service gateway 1236.

In some examples, the secure host tenancy 1204 can be directly connected to the service tenancy 1219, which may be otherwise isolated. The secure host subnet 1208 can communicate with the SSH subnet 1214 through an LPG 1210 that may enable two-way communication over an otherwise isolated system. Connecting the secure host subnet 1208 to the SSH subnet 1214 may give the secure host subnet 1208 access to other entities within the service tenancy 1219.

The control plane VCN 1216 may allow users of the service tenancy 1219 to set up or otherwise provision desired resources. Desired resources provisioned in the control plane VCN 1216 may be deployed or otherwise used in the data plane VCN 1218. In some examples, the control plane VCN 1216 can be isolated from the data plane VCN 1218, and the data plane mirror app tier 1240 of the control plane VCN 1216 can communicate with the data plane app tier 1246 of the data plane VCN 1218 via VNICs 1242 that can be contained in the data plane mirror app tier 1240 and the data plane app tier 1246.

In some examples, users of the system, or customers, can make requests, for example create, read, update, or delete (CRUD) operations, through public Internet 1254 that can communicate the requests to the metadata management service 1252. The metadata management service 1252 can communicate the request to the control plane VCN 1216 through the Internet gateway 1234. The request can be received by the LB subnet(s) 1222 contained in the control plane DMZ tier 1220. The LB subnet(s) 1222 may determine that the request is valid, and in response to this determination, the LB subnet(s) 1222 can transmit the request to app subnet(s) 1226 contained in the control plane app tier 1224. If the request is validated and requires a call to public Internet 1254, the call to public Internet 1254 may be transmitted to the NAT gateway 1238 that can make the call to public Internet 1254. Memory that may be desired to be stored by the request can be stored in the DB subnet(s) 1230.

In some examples, the data plane mirror app tier 1240 can facilitate direct communication between the control plane VCN 1216 and the data plane VCN 1218. For example, changes, updates, or other suitable modifications to configuration may be desired to be applied to the resources contained in the data plane VCN 1218. Via a VNIC 1242, the control plane VCN 1216 can directly communicate with, and can thereby execute the changes, updates, or other suitable modifications to configuration to, resources contained in the data plane VCN 1218.

In some embodiments, the control plane VCN 1216 and the data plane VCN 1218 can be contained in the service tenancy 1219. In this case, the user, or the customer, of the system may not own or operate either the control plane VCN 1216 or the data plane VCN 1218. Instead, the IaaS provider may own or operate the control plane VCN 1216 and the data plane VCN 1218, both of which may be contained in the service tenancy 1219. This embodiment can enable isolation of networks that may prevent users or customers from interacting with other users', or other customers', resources. Also, this embodiment may allow users or customers of the system to store databases privately without needing to rely on public Internet 1254, which may not have a desired level of security, for storage.

In other embodiments, the LB subnet(s) 1222 contained in the control plane VCN 1216 can be configured to receive a signal from the service gateway 1236. In this embodiment, the control plane VCN 1216 and the data plane VCN 1218 may be configured to be called by a customer of the IaaS provider without calling public Internet 1254. Customers of the IaaS provider may desire this embodiment since database(s) that the customers use may be controlled by the IaaS provider and may be stored on the service tenancy 1219, which may be isolated from public Internet 1254.

Figure 13:
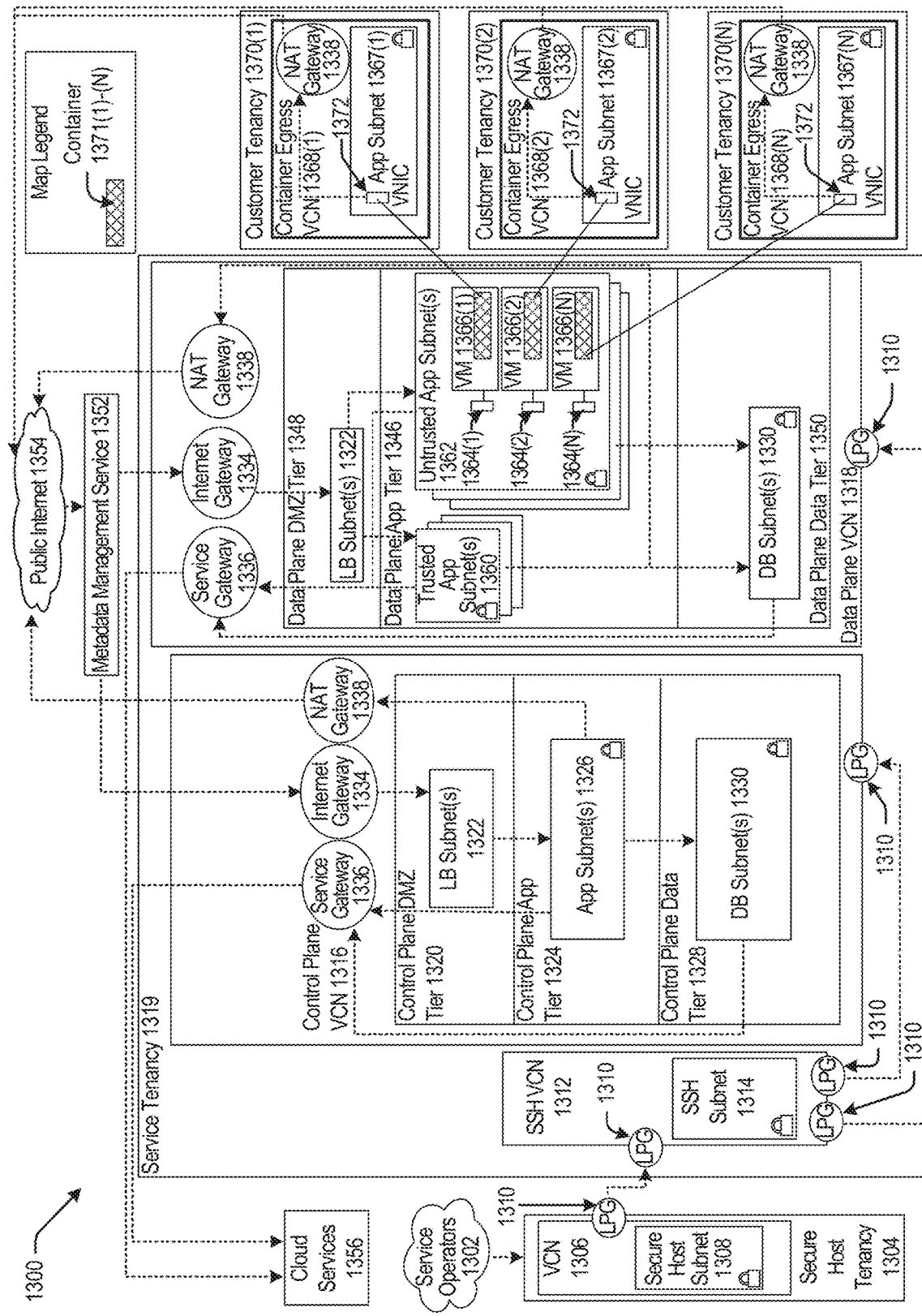
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g. service operators 1202 of FIG. 12) can be communicatively coupled to a secure host tenancy 1304 (e.g. the secure host tenancy 1204 of FIG. 12) that can include a virtual cloud network (VCN) 1306 (e.g. the VCN 1206 of FIG. 12) and a secure host subnet 1308 (e.g. the secure host subnet 1208 of FIG. 12). The VCN 1306 can include a local peering gateway (LPG) 1310 (e.g. the LPG 1210 of FIG. 12) that can be communicatively coupled to a secure shell (SSH) VCN 1312 (e.g. the SSH VCN 1212 of FIG. 12) via an LPG 1310 contained in the SSH VCN 1312. The SSH VCN 1312 can include an SSH subnet 1314 (e.g. the SSH subnet 1214 of FIG. 12), and the SSH VCN 1312 can be communicatively coupled to a control plane VCN 1316 (e.g. the control plane VCN 1216 of FIG. 12) via an LPG 1310 contained in the control plane VCN 1316. The control plane VCN 1316 can be contained in a service tenancy 1319 (e.g. the service tenancy 1219 of FIG. 12), and the data plane VCN 1318 (e.g. the data plane VCN 1218 of FIG. 12) can be contained in a customer tenancy 1321 that may be owned or operated by users, or customers, of the system.

The control plane VCN 1316 can include a control plane DMZ tier 1320 (e.g. the control plane DMZ tier 1220 of FIG. 12) that can include LB subnet(s) 1322 (e.g. LB subnet(s) 1222 of FIG. 12), a control plane app tier 1324 (e.g. the control plane app tier 1224 of FIG. 12) that can include app subnet(s) 1326 (e.g. app subnet(s) 1226 of FIG. 12), a control plane data tier 1328 (e.g. the control plane data tier 1228 of FIG. 12) that can include database (DB) subnet(s) 1330 (e.g. similar to DB subnet(s) 1230 of FIG. 12). The LB subnet(s) 1322 contained in the control plane DMZ tier 1320 can be communicatively coupled to the app subnet(s) 1326 contained in the control plane app tier 1324 and an Internet gateway 1334 (e.g. the Internet gateway 1234 of FIG. 12) that can be contained in the control plane VCN 1316, and the app subnet(s) 1326 can be communicatively coupled to the DB subnet(s) 1330 contained in the control plane data tier 1328 and a service gateway 1336 (e.g. the service gateway of FIG. 12) and a network address translation (NAT) gateway 1338 (e.g. the NAT gateway 1238 of FIG. 12). The control plane VCN 1316 can include the service gateway 1336 and the NAT gateway 1338.

The control plane VCN 1316 can include a data plane mirror app tier 1340 (e.g. the data plane mirror app tier 1240 of FIG. 12) that can include app subnet(s) 1326. The app subnet(s) 1326 contained in the data plane mirror app tier 1340 can include a virtual network interface controller (VNIC) 1342 (e.g. the VNIC of 1242) that can execute a compute instance 1344 (e.g. similar to the compute instance 1244 of FIG. 12). The compute instance 1344 can facilitate communication between the app subnet(s) 1326 of the data plane mirror app tier 1340 and the app subnet(s) 1326 that can be contained in a data plane app tier 1346 (e.g. the data plane app tier 1246 of FIG. 12) via the VNIC 1342 contained in the data plane mirror app tier 1340 and the VNIC 1342 contained in the data plane app tier 1346.

The Internet gateway 1334 contained in the control plane VCN 1316 can be communicatively coupled to a metadata management service 1352 (e.g. the metadata management service 1252 of FIG. 12) that can be communicatively coupled to public Internet 1354 (e.g. public Internet 1254 of FIG. 12). Public Internet 1354 can be communicatively coupled to the NAT gateway 1338 contained in the control plane VCN 1316. The service gateway 1336 contained in the control plane VCN 1316 can be communicatively couple to cloud services 1356 (e.g. cloud services 1256 of FIG. 12).

In some examples, the data plane VCN 1318 can be contained in the customer tenancy 1321. In this case, the IaaS provider may provide the control plane VCN 1316 for each customer, and the IaaS provider may, for each customer, set up a unique compute instance 1344 that is contained in the service tenancy 1319. Each compute instance 1344 may allow communication between the control plane VCN 1316, contained in the service tenancy 1319, and the data plane VCN 1318 that is contained in the customer tenancy 1321. The compute instance 1344 may allow resources, that are provisioned in the control plane VCN 1316 that is contained in the service tenancy 1319, to be deployed or otherwise used in the data plane VCN 1318 that is contained in the customer tenancy 1321.

In other examples, the customer of the IaaS provider may have databases that live in the customer tenancy 1321. In this example, the control plane VCN 1316 can include the data plane mirror app tier 1340 that can include app subnet(s) 1326. The data plane mirror app tier 1340 can reside in the data plane VCN 1318, but the data plane mirror app tier 1340 may not live in the data plane VCN 1318. That is, the data plane mirror app tier 1340 may have access to the customer tenancy 1321, but the data plane mirror app tier 1340 may not exist in the data plane VCN 1318 or be owned or operated by the customer of the IaaS provider. The data plane mirror app tier 1340 may be configured to make calls to the data plane VCN 1318 but may not be configured to make calls to any entity contained in the control plane VCN 1316. The customer may desire to deploy or otherwise use resources in the data plane VCN 1318 that are provisioned in the control plane VCN 1316, and the data plane mirror app tier 1340 can facilitate the desired deployment, or other usage of resources, of the customer.

In some embodiments, the customer of the IaaS provider can apply filters to the data plane VCN 1318. In this embodiment, the customer can determine what the data plane VCN 1318 can access, and the customer may restrict access to public Internet 1354 from the data plane VCN 1318. The IaaS provider may not be able to apply filters or otherwise control access of the data plane VCN 1318 to any outside networks or databases. Applying filters and controls by the customer onto the data plane VCN 1318, contained in the customer tenancy 1321, can help isolate the data plane VCN 1318 from other customers and from public Internet 1354.

In some embodiments, cloud services 1356 can be called by the service gateway 1336 to access services that may not exist on public Internet 1354, on the control plane VCN 1316, or on the data plane VCN 1318. The connection between cloud services 1356 and the control plane VCN 1316 or the data plane VCN 1318 may not be live or continuous. Cloud services 1356 may exist on a different network owned or operated by the IaaS provider. Cloud services 1356 may be configured to receive calls from the service gateway 1336 and may be configured to not receive calls from public Internet 1354. Some cloud services 1356 may be isolated from other cloud services 1356, and the control plane VCN 1316 may be isolated from cloud services 1356 that may not be in the same region as the control plane VCN 1316. For example, the control plane VCN 1316 may be located in "Region 1," and cloud service "Deployment 12," may be located in Region 1 and in "Region 2." If a call to Deployment 12 is made by the service gateway 1336 contained in the control plane VCN 1316 located in Region 1, the call may be transmitted to Deployment 12 in Region 1. In this example, the control plane VCN 1316, or Deployment 12 in Region 1, may not be communicatively coupled to, or otherwise in communication with, Deployment 12 in Region 2.

Figure 14:
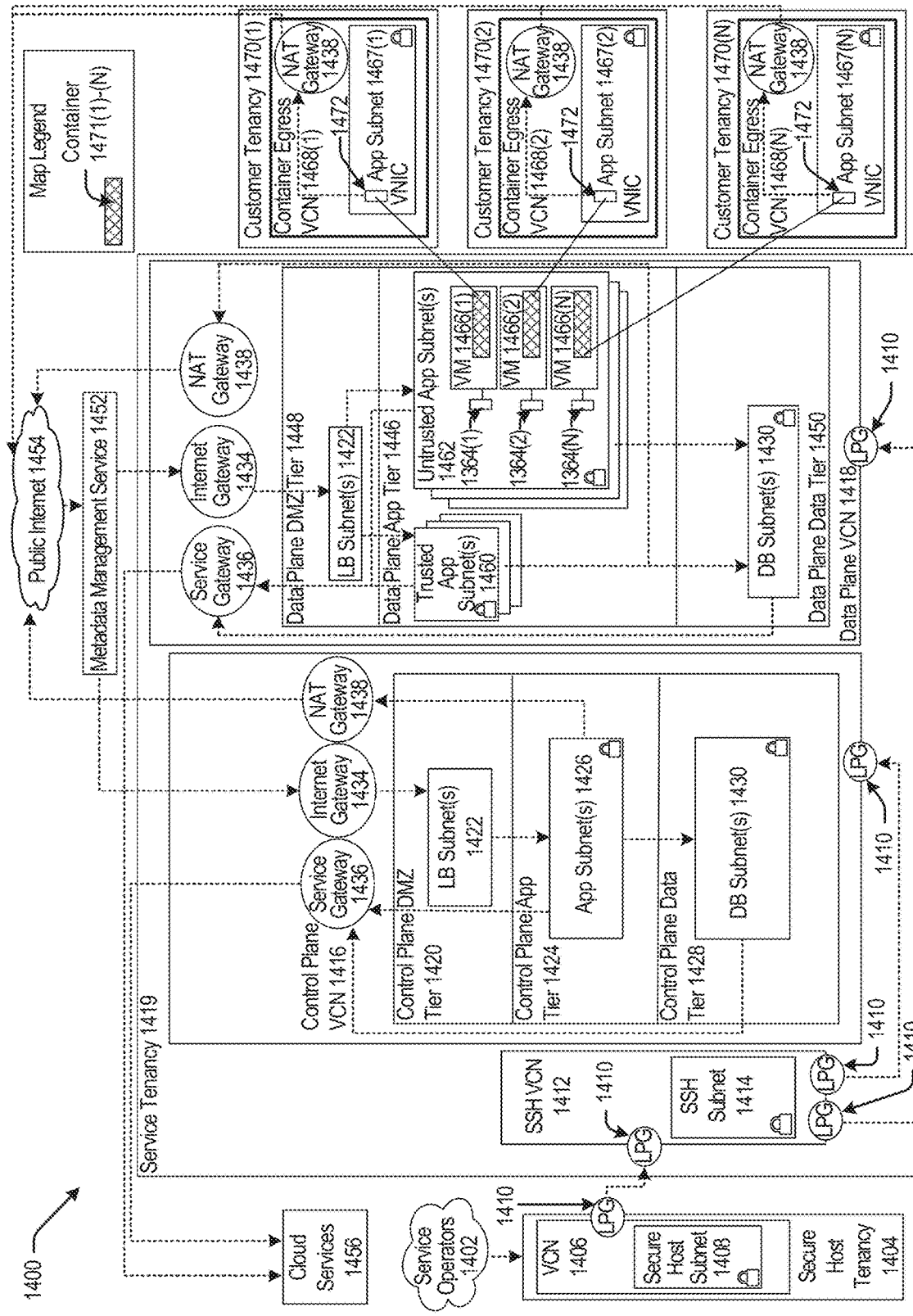
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g. service operators 1202 of FIG. 12) can be communicatively coupled to a secure host tenancy 1404 (e.g. the secure host tenancy 1204 of FIG. 12) that can include a virtual cloud network (VCN) 1406 (e.g. the VCN 1206 of FIG. 12) and a secure host subnet 1408 (e.g. the secure host subnet 1208 of FIG. 12). The VCN 1406 can include an LPG 1410 (e.g. the LPG 1210 of FIG. 12) that can be communicatively coupled to an SSH VCN 1412 (e.g. the SSH VCN 1212 of FIG. 12) via an LPG 1410 contained in the SSH VCN 1412. The SSH VCN 1412 can include an SSH subnet 1414 (e.g. the SSH subnet 1214 of FIG. 12), and the SSH VCN 1412 can be communicatively coupled to a control plane VCN 1416 (e.g. the control plane VCN 1216 of FIG. 12) via an LPG 1410 contained in the control plane VCN 1416 and to a data plane VCN 1418 (e.g. the data plane 1218 of FIG. 12) via an LPG 1410 contained in the data plane VCN 1418. The control plane VCN 1416 and the data plane VCN 1418 can be contained in a service tenancy 1419 (e.g. the service tenancy 1219 of FIG. 12).

The control plane VCN 1416 can include a control plane DMZ tier 1420 (e.g. the control plane DMZ tier 1220 of FIG. 12) that can include load balancer (LB) subnet(s) 1422 (e.g. LB subnet(s) 1222 of FIG. 12), a control plane app tier 1424 (e.g. the control plane app tier 1224 of FIG. 12) that can include app subnet(s) 1426 (e.g. similar to app subnet(s) 1226 of FIG. 12), a control plane data tier 1428 (e.g. the control plane data tier 1228 of FIG. 12) that can include DB subnet(s) 1430. The LB subnet(s) 1422 contained in the control plane DMZ tier 1420 can be communicatively coupled to the app subnet(s) 1426 contained in the control plane app tier 1424 and to an Internet gateway 1434 (e.g. the Internet gateway 1234 of FIG. 12) that can be contained in the control plane VCN 1416, and the app subnet(s) 1426 can be communicatively coupled to the DB subnet(s) 1430 contained in the control plane data tier 1428 and to a service gateway 1436 (e.g. the service gateway of FIG. 12) and a network address translation (NAT) gateway 1438 (e.g. the NAT gateway 1238 of FIG. 12). The control plane VCN 1416 can include the service gateway 1436 and the NAT gateway 1438.

The data plane VCN 1418 can include a data plane app tier 1446 (e.g. the data plane app tier 1246 of FIG. 12), a data plane DMZ tier 1448 (e.g. the data plane DMZ tier 1248 of FIG. 12), and a data plane data tier 1450 (e.g. the data plane data tier 1250 of FIG. 12). The data plane DMZ tier 1448 can include LB subnet(s) 1422 that can be communicatively coupled to trusted app subnet(s) 1460 and untrusted app subnet(s) 1462 of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include one or more primary VNICs 1464(1)-(N) that can be communicatively coupled to tenant virtual machines (VMs) 1466(1)-(N). Each tenant VM 1466(1)-(N) can be communicatively coupled to a respective app subnet 1467(1)-(N) that can be contained in respective container egress VCNs 1468(1)-(N) that can be contained in respective customer tenancies 1470(1)-(N). Respective secondary VNICs 1472(1)-(N) can facilitate communication between the untrusted app subnet(s) 1462 contained in the data plane VCN 1418 and the app subnet contained in the container egress VCNs 1468(1)-(N). Each container egress VCNs 1468(1)-(N) can include a NAT gateway 1438 that can be communicatively coupled to public Internet 1454 (e.g. public Internet 1254 of FIG. 12).

The Internet gateway 1434 contained in the control plane VCN 1416 and contained in the data plane VCN 1418 can be communicatively coupled to a metadata management service 1452 (e.g. the metadata management system 1252 of FIG. 12) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some embodiments, the data plane VCN 1418 can be integrated with customer tenancies 1470. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1446. Code to run the function may be executed in the VMs 1466(1)-(N), and the code may not be configured to run anywhere else on the data plane VCN 1418. Each VM 1466(1)-(N) may be connected to one customer tenancy 1470. Respective containers 1471(1)-(N) contained in the VMs 1466(1)-(N) may be configured to run the code. In this case, there can be a dual isolation (e.g., the containers 1471(1)-(N) running code, where the containers 1471(1)-(N) may be contained in at least the VM 1466(1)-(N) that are contained in the untrusted app subnet(s) 1462), which may help prevent incorrect or otherwise undesirable code from damaging the network of the IaaS provider or from damaging a network of a different customer. The containers 1471(1)-(N) may be communicatively coupled to the customer tenancy 1470 and may be configured to transmit or receive data from the customer tenancy 1470. The containers 1471(1)-(N) may not be configured to transmit or receive data from any other entity in the data plane VCN 1418. Upon completion of running the code, the IaaS provider may kill or otherwise dispose of the containers 1471(1)-(N).

In some embodiments, the trusted app subnet(s) 1460 may run code that may be owned or operated by the IaaS provider. In this embodiment, the trusted app subnet(s) 1460 may be communicatively coupled to the DB subnet(s) 1430 and be configured to execute CRUD operations in the DB subnet(s) 1430. The untrusted app subnet(s) 1462 may be communicatively coupled to the DB subnet(s) 1430, but in this embodiment, the untrusted app subnet(s) may be configured to execute read operations in the DB subnet(s) 1430. The containers 1471(1)-(N) that can be contained in the VM 1466(1)-(N) of each customer and that may run code from the customer may not be communicatively coupled with the DB subnet(s) 1430.

In other embodiments, the control plane VCN 1416 and the data plane VCN 1418 may not be directly communicatively coupled. In this embodiment, there may be no direct communication between the control plane VCN 1416 and the data plane VCN 1418. However, communication can occur indirectly through at least one method. An LPG 1410 may be established by the IaaS provider that can facilitate communication between the control plane VCN 1416 and the data plane VCN 1418. In another example, the control plane VCN 1416 or the data plane VCN 1418 can make a call to cloud services 1456 via the service gateway 1436. For example, a call to cloud services 1456 from the control plane VCN 1416 can include a request for a service that can communicate with the data plane VCN 1418.

Figure 15:
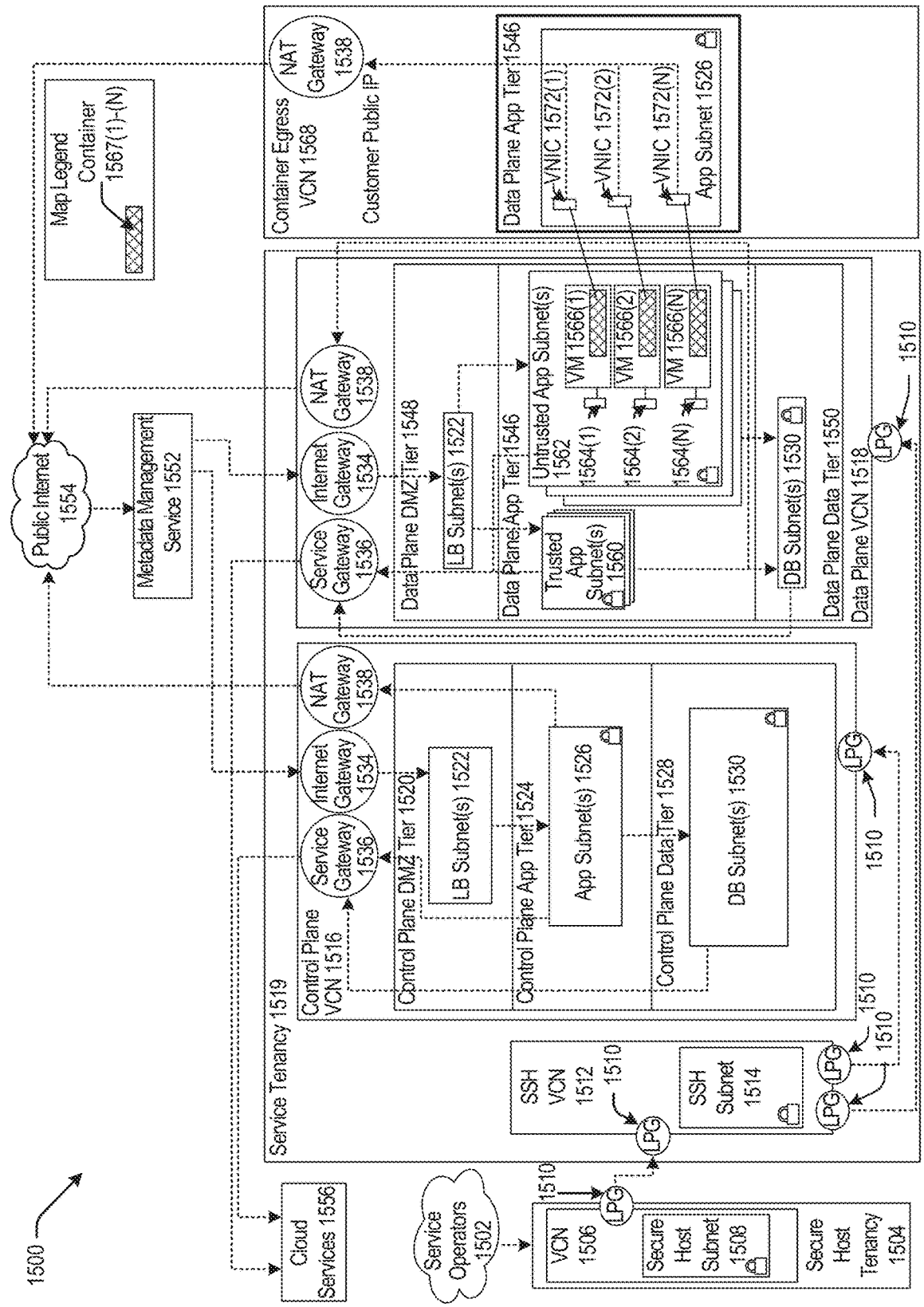
FIG. 15 is a block diagram illustrating another pattern for implementing a cloud infrastructure as a service system, according to at least one embodiment.

FIG. 15 is a block diagram 1500 illustrating another example pattern of an IaaS architecture, according to at least one embodiment. Service operators 1502 (e.g. service operators 1202 of FIG. 12) can be communicatively coupled to a secure host tenancy 1504 (e.g. the secure host tenancy 1204 of FIG. 12) that can include a virtual cloud network (VCN) 1506 (e.g. the VCN 1206 of FIG. 12) and a secure host subnet 1508 (e.g. the secure host subnet 1208 of FIG. 12). The VCN 1506 can include an LPG 1510 (e.g. the LPG 1210 of FIG. 12) that can be communicatively coupled to an SSH VCN 1512 (e.g. the SSH VCN 1212 of FIG. 12) via an LPG 1510 contained in the SSH VCN 1512. The SSH VCN 1512 can include an SSH subnet 1514 (e.g. the SSH subnet 1214 of FIG. 12), and the SSH VCN 1512 can be communicatively coupled to a control plane VCN 1516 (e.g. the control plane VCN 1216 of FIG. 12) via an LPG 1510 contained in the control plane VCN 1516 and to a data plane VCN 1518 (e.g. the data plane 1218 of FIG. 12) via an LPG 1510 contained in the data plane VCN 1518. The control plane VCN 1516 and the data plane VCN 1518 can be contained in a service tenancy 1519 (e.g. the service tenancy 1219 of FIG. 12).

The control plane VCN 1516 can include a control plane DMZ tier 1520 (e.g. the control plane DMZ tier 1220 of FIG. 12) that can include LB subnet(s) 1522 (e.g. LB subnet(s) 1222 of FIG. 12), a control plane app tier 1524 (e.g. the control plane app tier 1224 of FIG. 12) that can include app subnet(s) 1526 (e.g. app subnet(s) 1226 of FIG. 12), a control plane data tier 1528 (e.g. the control plane data tier 1228 of FIG. 12) that can include DB subnet(s) 1530 (e.g. DB subnet(s) 1430 of FIG. 14). The LB subnet(s) 1522 contained in the control plane DMZ tier 1520 can be communicatively coupled to the app subnet(s) 1526 contained in the control plane app tier 1524 and to an Internet gateway 1534 (e.g. the Internet gateway 1234 of FIG. 12) that can be contained in the control plane VCN 1516, and the app subnet(s) 1526 can be communicatively coupled to the DB subnet(s) 1530 contained in the control plane data tier 1528 and to a service gateway 1536 (e.g. the service gateway of FIG. 12) and a network address translation (NAT) gateway 1538 (e.g. the NAT gateway 1238 of FIG. 12). The control plane VCN 1516 can include the service gateway 1536 and the NAT gateway 1538.

The data plane VCN 1518 can include a data plane app tier 1546 (e.g. the data plane app tier 1246 of FIG. 12), a data plane DMZ tier 1548 (e.g. the data plane DMZ tier 1248 of FIG. 12), and a data plane data tier 1550 (e.g. the data plane data tier 1250 of FIG. 12). The data plane DMZ tier 1548 can include LB subnet(s) 1522 that can be communicatively coupled to trusted app subnet(s) 1560 (e.g. trusted app subnet(s) 1460 of FIG. 14) and untrusted app subnet(s) 1562 (e.g. untrusted app subnet(s) 1462 of FIG. 14) of the data plane app tier 1546 and the Internet gateway 1534 contained in the data plane VCN 1518. The trusted app subnet(s) 1560 can be communicatively coupled to the service gateway 1536 contained in the data plane VCN 1518, the NAT gateway 1538 contained in the data plane VCN 1518, and DB subnet(s) 1530 contained in the data plane data tier 1550. The untrusted app subnet(s) 1562 can be communicatively coupled to the service gateway 1536 contained in the data plane VCN 1518 and DB subnet(s) 1530 contained in the data plane data tier 1550. The data plane data tier 1550 can include DB subnet(s) 1530 that can be communicatively coupled to the service gateway 1536 contained in the data plane VCN 1518.

The untrusted app subnet(s) 1562 can include primary VNICs 1564(1)-(N) that can be communicatively coupled to tenant virtual machines (VMs) 1566(1)-(N) residing within the untrusted app subnet(s) 1562. Each tenant VM 1566(1)-(N) can run code in a respective container 1567(1)-(N), and be communicatively coupled to an app subnet 1526 that can be contained in a data plane app tier 1546 that can be contained in a container egress VCN 1568. Respective secondary VNICs 1572(1)-(N) can facilitate communication between the untrusted app subnet(s) 1562 contained in the data plane VCN 1518 and the app subnet contained in the container egress VCN 1568. The container egress VCN can include a NAT gateway 1538 that can be communicatively coupled to public Internet 1554 (e.g. public Internet 1254 of FIG. 12).

The Internet gateway 1534 contained in the control plane VCN 1516 and contained in the data plane VCN 1518 can be communicatively coupled to a metadata management service 1552 (e.g. the metadata management system 1252 of FIG. 12) that can be communicatively coupled to public Internet 1554. Public Internet 1554 can be communicatively coupled to the NAT gateway 1538 contained in the control plane VCN 1516 and contained in the data plane VCN 1518. The service gateway 1536 contained in the control plane VCN 1516 and contained in the data plane VCN 1518 can be communicatively couple to cloud services 1556.

In some examples, the pattern illustrated by the architecture of block diagram 1500 of FIG. 15 may be considered an exception to the pattern illustrated by the architecture of block diagram 1400 of FIG. 14 and may be desirable for a customer of the IaaS provider if the IaaS provider cannot directly communicate with the customer (e.g., a disconnected region). The respective containers 1567(1)-(N) that are contained in the VMs 1566(1)-(N) for each customer can be accessed in real-time by the customer. The containers 1567(1)-(N) may be configured to make calls to respective secondary VNICs 1572(1)-(N) contained in app subnet(s) 1526 of the data plane app tier 1546 that can be contained in the container egress VCN 1568. The secondary VNICs 1572(1)-(N) can transmit the calls to the NAT gateway 1538 that may transmit the calls to public Internet 1554. In this example, the containers 1567(1)-(N) that can be accessed in real-time by the customer can be isolated from the control plane VCN 1516 and can be isolated from other entities contained in the data plane VCN 1518. The containers 1567(1)-(N) may also be isolated from resources from other customers.

In other examples, the customer can use the containers 1567(1)-(N) to call cloud services 1556. In this example, the customer may run code in the containers 1567(1)-(N) that requests a service from cloud services 1556. The containers 1567(1)-(N) can transmit this request to the secondary VNICs 1572(1)-(N) that can transmit the request to the NAT gateway that can transmit the request to public Internet 1554. Public Internet 1554 can transmit the request to LB subnet(s) 1522 contained in the control plane VCN 1516 via the Internet gateway 1534. In response to determining the request is valid, the LB subnet(s) can transmit the request to app subnet(s) 1526 that can transmit the request to cloud services 1556 via the service gateway 1536.

It should be appreciated that IaaS architectures 1200, 1300, 1400, 1500 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 16:
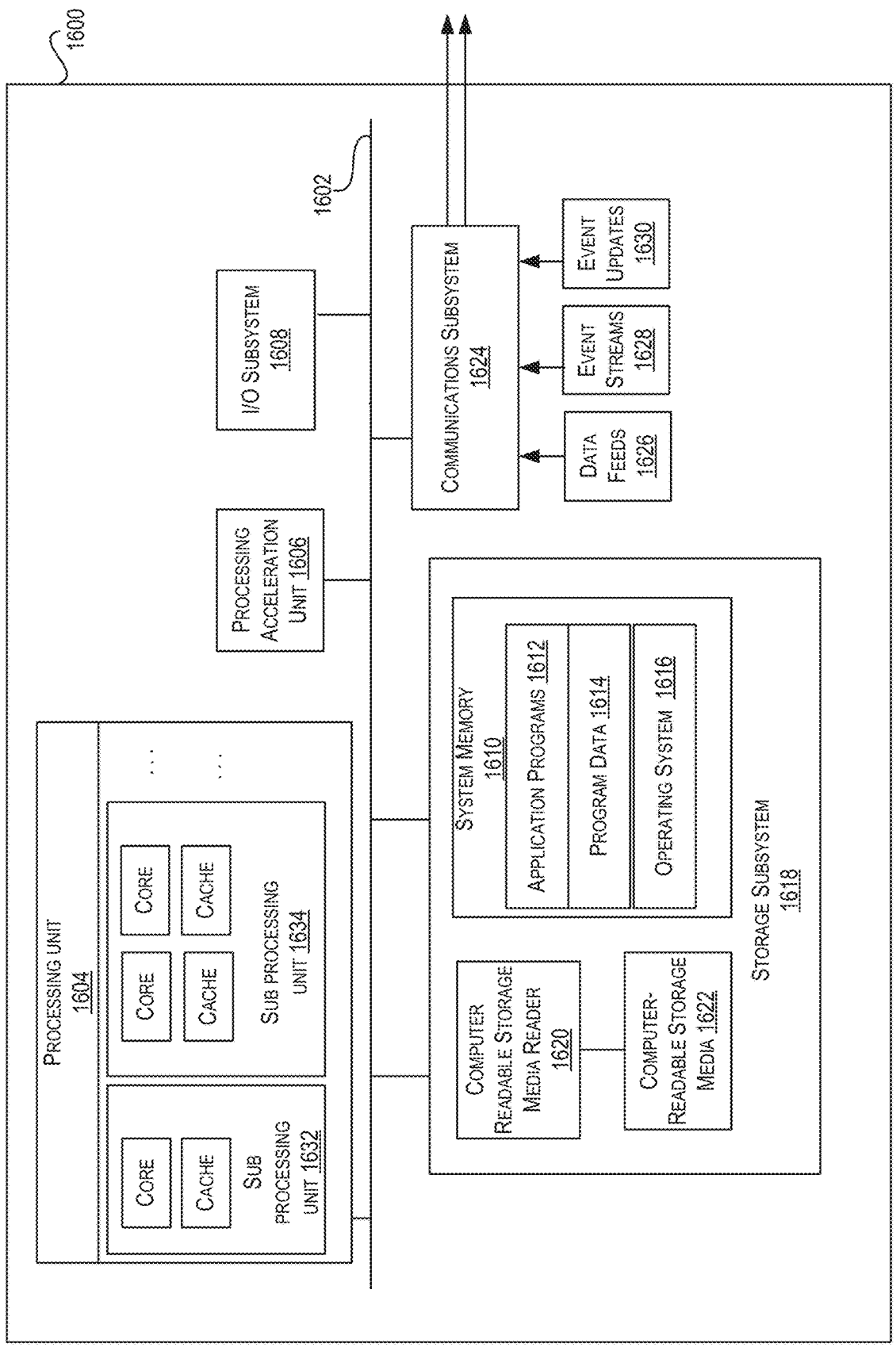
FIG. 16 is a block diagram illustrating an example computer system, according to at least one embodiment.

FIG. 16 illustrates an example computer system 1600, in which various embodiments may be implemented. The system 1600 may be used to implement any of the computer systems described above. As shown in the figure, computer system 1600 includes a processing unit 1604 that communicates with a number of peripheral subsystems via a bus subsystem 1602. These peripheral subsystems may include a processing acceleration unit 1606, an I/O subsystem 1608, a storage subsystem 1618 and a communications subsystem 1624. Storage subsystem 1618 includes tangible computer-readable storage media 1622 and a system memory 1610.

Bus subsystem 1602 provides a mechanism for letting the various components and subsystems of computer system 1600 communicate with each other as intended. Although bus subsystem 1602 is shown schematically as a single bus, alternative embodiments of the bus subsystem may utilize multiple buses. Bus subsystem 1602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1604, which can be implemented as one or more integrated circuits (e.g., a conventional microprocessor or microcontroller), controls the operation of computer system 1600. One or more processors may be included in processing unit 1604. These processors may include single core or multicore processors. In certain embodiments, processing unit 1604 may be implemented as one or more independent processing units 1632 and/or 1634 with single or multicore processors included in each processing unit. In other embodiments, processing unit 1604 may also be implemented as a quad-core processing unit formed by integrating two dual-core processors into a single chip.

In various embodiments, processing unit 1604 can execute a variety of programs in response to program code and can maintain multiple concurrently executing programs or processes. At any given time, some or all of the program code to be executed can be resident in processor(s) 1604 and/or in storage subsystem 1618. Through suitable programming, processor(s) 1604 can provide various functionalities described above. Computer system 1600 may additionally include a processing acceleration unit 1606, which can include a digital signal processor (DSP), a special-purpose processor, and/or the like.

I/O subsystem 1608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1600 may comprise a storage subsystem 1618 that comprises software elements, shown as being currently located within a system memory 1610. System memory 1610 may store program instructions that are loadable and executable on processing unit 1604, as well as data generated during the execution of these programs.

Depending on the configuration and type of computer system 1600, system memory 1610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1604. In some implementations, system memory 1610 may include multiple different types of memory, such as static random access memory (SRAM) or dynamic random access memory (DRAM). In some implementations, a basic input/output system (BIOS), containing the basic routines that help to transfer information between elements within computer system 1600, such as during start-up, may typically be stored in the ROM. By way of example, and not limitation, system memory 1610 also illustrates application programs 1612, which may include client applications, Web browsers, mid-tier applications, relational database management systems (RDBMS), etc., program data 1614, and an operating system 1616. By way of example, operating system 1616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 16 OS, and Palm® OS operating systems.

Storage subsystem 1618 may also provide a tangible computer-readable storage medium for storing the basic programming and data constructs that provide the functionality of some embodiments. Software (programs, code modules, instructions) that when executed by a processor provide the functionality described above may be stored in storage subsystem 1618. These software modules or instructions may be executed by processing unit 1604. Storage subsystem 1618 may also provide a repository for storing data used in accordance with the present disclosure.

Storage subsystem 1600 may also include a computer-readable storage media reader 1620 that can further be connected to computer-readable storage media 1622. Together and, optionally, in combination with system memory 1610, computer-readable storage media 1622 may comprehensively represent remote, local, fixed, and/or removable storage devices plus storage media for temporarily and/or more permanently containing, storing, transmitting, and retrieving computer-readable information.

Computer-readable storage media 1622 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1600.

By way of example, computer-readable storage media 1622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1622 may include, but is not limited to, Zip® drives, flash memory cards, universal serial bus (USB) flash drives, secure digital (SD) cards, DVD disks, digital video tape, and the like. Computer-readable storage media 1622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1600.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to connect to one or more devices via the Internet. In some embodiments communications subsystem 1624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1624 can provide wired network connectivity (e.g., Ethernet) in addition to or instead of a wireless interface.

In some embodiments, communications subsystem 1624 may also receive input communication in the form of structured and/or unstructured data feeds 1626, event streams 1628, event updates 1630, and the like on behalf of one or more users who may use computer system 1600.

By way of example, communications subsystem 1624 may be configured to receive data feeds 1626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1624 may also be configured to receive data in the form of continuous data streams, which may include event streams 1628 of real-time events and/or event updates 1630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1624 may also be configured to output the structured and/or unstructured data feeds 1626, event streams 1628, event updates 1630, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein. In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
receiving, by a redirector (RD) in a cloud hosted data center, a packet originating from a source device in an on-premises data center, the packet belonging to a connection and being directed to a particular destination IP address associated with a router located in the cloud hosted data center, wherein a destination address field in a header of the packet is set to the particular destination IP address;

determining, by the RD, whether the packet addressed to be directed to the router is to be forwarded to the router or whether the packet is to be forwarded to a host machine implementing a service host in a virtual cloud network (VCN), the determining being performed based on a pair of IP addresses associated with the connection, the pair of IP addresses including a source IP address of the source device and the particular destination IP address of the router;

responsive to determining by the RD that the packet is to be forwarded to the host machine:
modifying, by the RD, the destination address field to be set to an address associated with the service host; and
causing the packet to be forwarded to the host machine; and responsive to determining by the RD that the packet is to be forwarded to the router, forwarding, by the RD, the packet to the router.

2. The method of claim 1, wherein the determining further comprises:
comparing, by the RD, the pair of IP addresses associated with the connection to information associated with a plurality of connections maintained in a database, wherein each of the plurality of connections is associated with a unique pair of IP addresses; and
verifying, by the RD, whether the pair of IP addresses associated with the connection matches any one of the unique pair of IP addresses.

3. The method of claim 1, wherein responsive to determining by the RD that the packet is to be forwarded to the host machine, the method further comprises:
transmitting, by the RD, the packet to a gateway; and
forwarding, by the gateway, the packet to the host machine.

4. The method of claim 3, wherein the gateway, the router, and the RD are located in a service enclave of the cloud hosted data center.

5. The method of claim 3, further comprising:
obtaining, by the RD, route information that is advertised by the router and associated with the particular destination IP address; and
re-advertising, by the RD, the route information to the gateway as preferential route information associated with the particular destination IP address.

6. The method of claim 1, wherein the service host corresponds to a compute instance implemented in software that is programmed to terminate the connection at a tunnel end-point (TEP).

7. A computing device located in a cloud hosted data center, the computing device comprising:
a processor; and
a memory including instructions that, when executed with the processor, cause the computing device to, at least:
receive a packet originating from a source device in an on-premises data center, the packet belonging to a connection and being directed to a particular destination IP address associated with a router located in the cloud hosted data center, wherein a destination address field in a header of the packet is set to the particular destination IP address;
determine, whether the packet addressed to be directed to the router is to be forwarded to the router or whether the packet is to be forwarded to a host machine implementing a service host in a virtual cloud network (VCN) based on a pair of IP addresses associated with the connection, the pair of IP addresses including a source IP address of the source device and the particular destination IP address of the router;
responsive to determining that the packet is to be forwarded to the host machine:
modify the destination address field to be set to an address associated with the service host; and
cause the packet to be forwarded to the host machine; and
responsive to determining that the packet is to be forwarded to the router, forwarding the packet to the router.

8. The computing device of claim 7, wherein the instructions when executed with the processor, causes the computing device to further:
compare the pair of IP addresses associated with the connection to information associated with a plurality of connections maintained in a database, wherein each of the plurality of connections is associated with a unique pair of IP addresses; and
verify whether the pair of IP addresses associated with the connection matches any one of the unique pair of IP addresses.

9. The computing device of claim 7, wherein responsive to determining that the packet is to be forwarded to the host machine, the computing device is further configured to:
transmit the packet to a gateway; and
forward, by the gateway, the packet to the host machine.

10. The computing device of claim 9, wherein the gateway, the router, and the computing device are located in a service enclave of the cloud hosted data center.

11. The computing device of claim 9, wherein the instructions when executed with the processor, causes the computing device to further:
obtain route information that is advertised by the router and associated with the particular destination IP address; and
re-advertise the route information to the gateway as preferential route information associated with the particular destination IP address.

12. The computing device of claim 7, wherein the service host corresponds to a compute instance implemented in software that is programmed to terminate the connection a tunnel end-point (TEP).

13. A non-transitory computer readable medium storing specific computer-executable instructions that, when executed by a processor, cause a computer system to at least:
receive, by a redirector (RD) in a cloud hosted data center, a packet originating from a source device in an on-premises data center, the packet belonging to a connection and being directed to a particular destination IP address associated with a router located in the cloud hosted data center, wherein a destination address field in a header of the packet is set to the particular destination IP address;
determine, by the RD, whether the packet addressed to be directed to the router is to be forwarded to the router or whether the packet is to be forwarded to a host machine implementing a service host in a virtual cloud network (VCN) based on a pair of IP addresses associated with the connection, the pair of IP addresses including a source IP address of the source device and the particular destination IP address of the router;

responsive to determining by the RD that the packet is to be forwarded to the host machine:
- modify, by the RD, the destination address field to be set to an address associated with the service host; and
- cause the packet to be forwarded to the host machine; and responsive to determining by the RD that the packet is to be forwarded to the router, forward, by the RD, the packet to the router.

14. The non-transitory computer readable medium of claim 13, wherein the computer system is further configured to:
- compare, by the RD, the pair of IP addresses associated with the connection to information associated with a plurality of connections maintained in a database, wherein each of the plurality of connections is associated with a unique pair of IP addresses; and
- verify, by the RD, whether the pair of IP addresses associated with the connection matches any one of the unique pair of IP addresses.

15. The non-transitory computer readable medium of claim 13, wherein responsive to determining by the RD that the packet is to be forwarded to the host machine, the computer system is further configured to:
- transmit, by the RD, the packet to a gateway; and
- forward, by the gateway, the packet to the host machine.

16. The non-transitory computer readable medium of claim 15, wherein the gateway, the router, and the RD are located in a service enclave of the cloud hosted data center.

17. The non-transitory computer readable medium of claim 13, wherein the service host corresponds to a compute instance implemented in software that is programmed to terminate the connection a tunnel end-point (TEP).

* * * * *

UNITED STATES PATENT AND TRADEMARK OFFICE
CERTIFICATE OF CORRECTION

PATENT NO. : 12,047,290 B2
APPLICATION NO. : 17/834113
DATED : July 23, 2024
INVENTOR(S) : Keane et al.

It is certified that error appears in the above-identified patent and that said Letters Patent is hereby corrected as shown below:

In the Drawings

On sheet 2 of 20, in FIG. 2, under reference numeral 268, Line 2, delete "INTANCE" and insert -- INSTANCE --, therefor.

On sheet 2 of 20, in FIG. 2, under reference numeral 274, Line 2, delete "INTANCE" and insert -- INSTANCE --, therefor.

On sheet 12 of 20, in FIG. 9C, under reference numeral 975, Line 1, delete "PAKCET" and insert -- PACKET --, therefor.

In the Specification

In Column 19, Line 63, Delete "and or" and insert -- and/or --, therefor.

Signed and Sealed this
Tenth Day of December, 2024

Katherine Kelly Vidal
*Director of the United States Patent and Trademark Office*